United States Patent
Petkov

(10) Patent No.: US 9,898,440 B2
(45) Date of Patent: Feb. 20, 2018

(54) CALCULATION FRAMEWORK UTILIZING FRAGMENTATION OF EXPRESSIONS

(71) Applicant: Aleksandar Petkov, Sofia (BG)

(72) Inventor: Aleksandar Petkov, Sofia (BG)

(73) Assignee: SAP SE, Walldorf (DE)

( * ) Notice: Subject to any disclaimer, the term of this patent is extended or adjusted under 35 U.S.C. 154(b) by 417 days.

(21) Appl. No.: 14/631,445

(22) Filed: Feb. 25, 2015

(65) Prior Publication Data

US 2016/0246756 A1     Aug. 25, 2016

(51) Int. Cl.
    *G06F 17/11*      (2006.01)

(52) U.S. Cl.
    CPC ................... *G06F 17/11* (2013.01)

(58) Field of Classification Search
    CPC ................ G06F 17/11; G06F 17/12
    USPC ....................................... 708/446
    See application file for complete search history.

(56) References Cited

U.S. PATENT DOCUMENTS

| | | | | |
|---|---|---|---|---|
| 5,410,701 A * | 4/1995 | Gopalraman | ............ | G06F 8/433 |
| | | | | 700/86 |
| 6,671,691 B1 | 12/2003 | Bigus | | |
| 7,062,479 B2 | 6/2006 | Edmunds | | |
| 7,769,783 B2 * | 8/2010 | Rozenshtein | ............ | G06F 17/10 |
| | | | | 707/793 |
| 8,091,024 B2 * | 1/2012 | Graeber | ................ | G06F 17/246 |
| | | | | 715/267 |
| 8,195,643 B2 | 6/2012 | Weyerhaeuser et al. | | |
| 8,314,793 B2 * | 11/2012 | Beckman | ............... | G06T 11/206 |
| | | | | 345/420 |
| 2004/0068529 A1 | 4/2004 | Pai | | |
| 2006/0282818 A1 | 12/2006 | DeSpain | | |
| 2007/0260667 A1 * | 11/2007 | Duzak | ................... | G06F 9/5066 |
| | | | | 708/521 |

(Continued)

OTHER PUBLICATIONS

Beard, Peter; "Syntax Trees for Mathematical Expressions", Oct. 2013, retrieved from http://www.peterbeard.co/blog/post/syntaxtreesformathematicalexpressions/.*

(Continued)

*Primary Examiner* — Matthew Sandifer
(74) *Attorney, Agent, or Firm* — Fountainhead Law Group P.C.

(57) ABSTRACT

A calculation engine computes equation(s) based upon dependencies between variables, both initially input and as calculated from various fragmented sub expressions. The calculation engine accommodates relationships between equations, with output variable(s) of one equation possibly serving as input to another equation in a chain. Initially, the calculation engine sorts equations based upon their relationship to each other and to the input variables. The calculation engine next fragments the equations' expressions into various sub expressions. This fragmenting may be according to an order of operations (e.g., brackets/parentheses, then exponents/powers, then multiplication/division). Sub expressions ultimately resulting from fragmentation process, may comprise unary expressions, binary expressions, or expressions involving three or more operations at a same level of priority. Upon rationalizing an order of the fragments, the engine may evaluate units (e.g., SI and others) thereof, allowing assignment of units to output variables of the larger and more complex equations.

20 Claims, 9 Drawing Sheets

(56) References Cited

U.S. PATENT DOCUMENTS

| | | |
|---|---|---|
| 2007/0298389 A1 | 12/2007 | Yu et al. |
| 2008/0066052 A1 | 3/2008 | Wolfram |
| 2008/0126027 A1 | 5/2008 | Altenhofen et al. |
| 2010/0191793 A1 | 7/2010 | Yang et al. |
| 2011/0080409 A1 | 4/2011 | Lee |
| 2012/0005190 A1 | 1/2012 | Faerber et al. |
| 2012/0130659 A1 | 5/2012 | Chaves |
| 2012/0158808 A1 | 6/2012 | Yang |

OTHER PUBLICATIONS

Oracle Business Intelligence Foundation Suite, Technical Overview; Oracle; Jan. 2011; 56 pages.

Article retrieved from the internet, entitled "Execute Formula in a String," printed on Jan. 21, 2015. http://scn.sap.com/thread/1444895.

Article retrieved from the internet, entitled "SAP Function EVAL_FORMULA—Analysis of a Syntactically Correct Formula," printed on Jan. 21, 2015. www.steschno.net/sap-functions.tml?view-sapfnc&id—EVAL_FORMULA.

Article retrieved from the internet, entitled "EVAL-FORMULA—Analysis of a Syntactically Correct Formula", printed Jan. 21, 2015. www.consolut.com/en/&/sap-ides-access/d/s/doc/F-EVAL_FORMULA.

Article retrieved from the internet, entitled "WTYBRF_MDOC—BRF Data Source: Measurement Document," printed on Jan. 21, 2015. www.consolut.com/en/&/sap.ides-access/d/&/doc/U-WTYBRF_MDOC.

Article retrieved from the internet, entitled "WTYBRF_MPOINT—BRF Data Source: Measurement Point," printed on Jan. 21, 2015. www.consolut.com/en/&/sap.ides-access/d/&/doc/U-WTYBRF_MPOINT.

\* cited by examiner

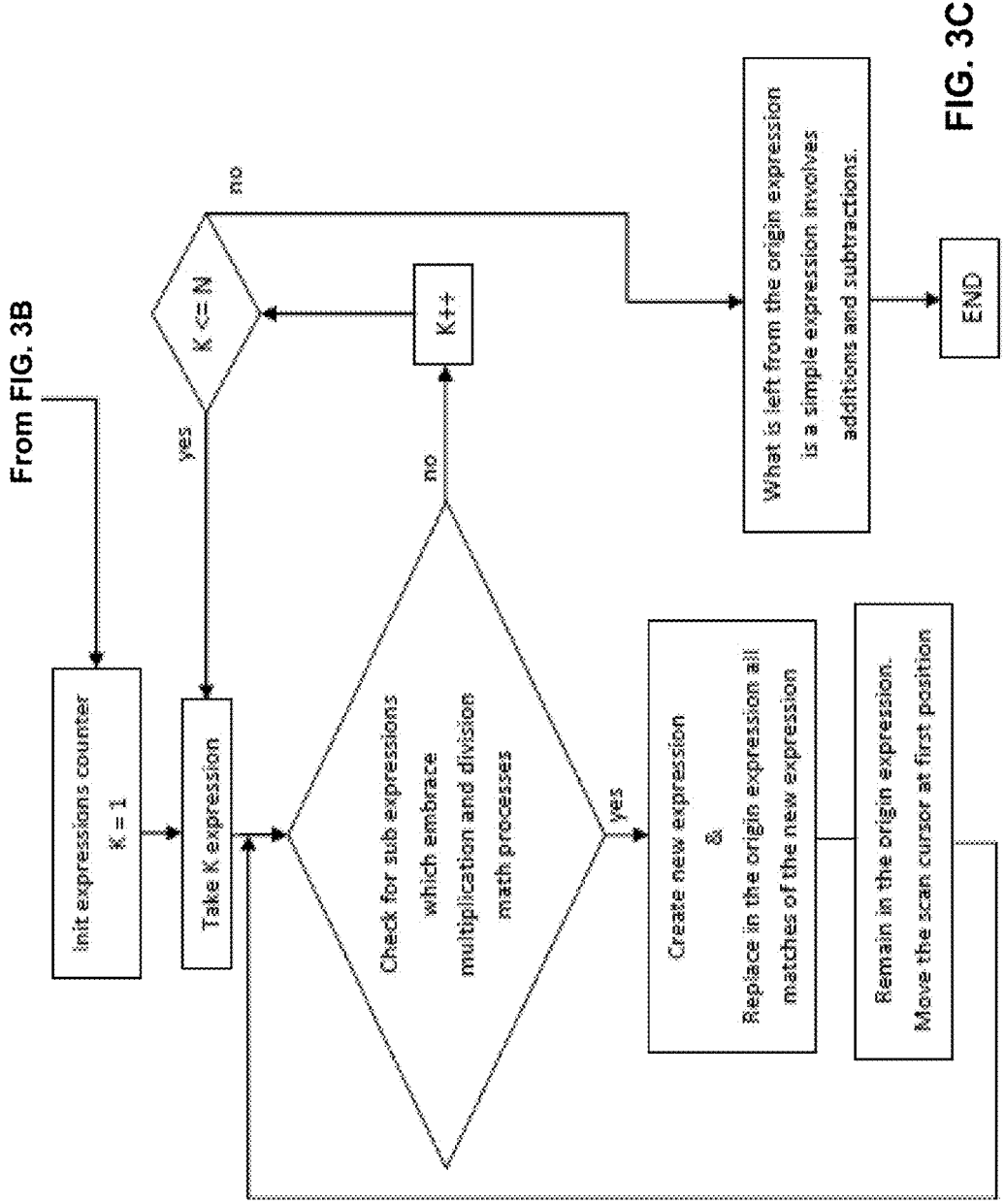

| Name | Given Unit | Unit Description | SI Unit | SI Unit Description | Dimension |
|---|---|---|---|---|---|
| X1 | LB | US pound | KG | Kilogram | Mass |
| X2 | | | | | |
| X3 | M | Meter | M | Meter | Length |
| X4 | HZ | Hertz (1/second) | HZ | Hertz (1/second) | Frequency |
| X5 | OZ | Ounce | KG | Kilogram | Mass |
| X6 | YD | Yards | M | Meter | Length |
| X7 | MMA | Millimeter/year | M/S | Meter/second | Speed |
| X8 | H | Hour | S | Second | Time |
| X9 | | | | | |
| X10 | MS2 | Meter/second squared | MS2 | Meter/second squared | Acceleration |
| X11 | TM3 | 1/cubic meter | TM3 | 1/cubic meter | Particle concentration |
| X12 | KGS | Kilogram/second | KGS | Kilogram/second | Mass flow |
| X13 | MON | Months | S | Second | Time |
| X14 | | | | | |

FIG. 5

CALCULATION FRAMEWORK UTILIZING FRAGMENTATION OF EXPRESSIONS

BACKGROUND

Unless otherwise indicated herein, the approaches described in this section are not prior art to the claims in this application and are not admitted to be prior art by inclusion in this section.

Embodiments relate to a calculation framework, and in particular to a calculation framework utilizing fragmentation of expressions.

In certain situations, a non-expert user may be called upon to interact with and manipulate a plurality of complex entities related by dependencies derived from relationships between them. One example is where different mathematical equations share one or more common variables. Another example is where a plurality of different decisions are related to each other according to a pathway (e.g., as may be visualized by a tree).

Under such circumstances, the abstract nature of the entities may interfere with an ordinary user recognizing underlying dependencies and interacting with the entities in an intuitive and meaningful way. This is particularly true where the number of related entities is large, and/or the nature of the dependencies between them is complex.

SUMMARY

A framework comprises a calculation engine computing equation(s) based upon dependencies between variables, both as initially input and as calculated from various sub expressions produced by fragmenting. The calculation engine accommodates relationships between equations, with output variable(s) of one equation possibly serving as input to other equation(s) in a chain. Initially, the calculation engine sorts equations based upon their relationship to each other and to the input variables. The calculation engine next fragments the equations' expressions into various sub expressions. This fragmenting may be according to an order of operations (e.g., first by brackets/parentheses, then by exponents/powers, then by multiplication/division, then by addition/subtraction). Sub expressions ultimately resulting from this fragmentation process may comprise unary expressions, binary expressions, or expressions involving three or more operations at a same level of priority. Upon rationalizing an order of the fragments, the engine may evaluate physical units (e.g., SI and others) thereof, ultimately allowing assignment of units to output variables of the larger and more complex equations.

An embodiment of a computer-implemented method comprises, an engine receiving a first entity comprising first metadata, and the engine receiving a second entity related to the first entity by a dependency. The engine sorts an order of the first entity relative and the second entity based on the dependency. The engine creates fragments of the first entity and the second entity. The engine determines an order of the fragments. The engine processes the fragments in the order to produce second metadata of the second entity, and the engine providing the second metadata to a user.

A non-transitory computer readable storage medium embodies a computer program for performing a method comprising, an engine receiving a variable comprising first metadata, the engine also receiving an equation including an expression referencing the variable. The engine creates fragments of the expression, and determines an order of the fragments. The engine processes the fragments in the order to produce second metadata of the equation, and provides the second metadata to a user.

An embodiment of a computer system comprises one or more processors and a software program executable on said computer system to cause a calculation engine to receive a first entity related to a second entity by a dependency. The software program is further executable to cause the engine to fragment the first entity into a plurality of sub expressions.

The software program is further configured to cause the engine to derive metadata of the plurality of sub expressions from metadata of the second entity. The software program is further configured to cause the engine to create metadata of the first entity based upon the metadata of the plurality of sub expressions, and to display the first metadata to a user.

In certain embodiments the first entity comprises a variable, the second entity comprises an equation, and the dependency comprises a mathematical relation.

According to some embodiments the first metadata comprises a first physical unit, and the second metadata comprises a second physical unit.

In various embodiments the second physical unit is a dimensional array.

In particular embodiments the engine creates the fragments according to a priority considering (i) grouping of expressions, (ii) exponents/powers in expressions, and (iii) multiplication/division in expressions.

A fragment may comprise a unary expression, a binary expression, or an expression involving three or more operations at a same priority level.

In certain embodiments the engine processes the fragments according to a table function.

According to some embodiments the dependency comprises a decision.

In various embodiments the first metadata comprises vector information.

The following detailed description and accompanying drawings provide a better understanding of the nature and advantages of embodiments.

BRIEF DESCRIPTION OF THE DRAWINGS

FIGS. 3A-3C are simplified views of a flow diagram of a fragmentation process according to an embodiment.

FIG. 5 is a table summarizing attributes of input variables in an example.

DETAILED DESCRIPTION

Described herein are techniques for providing a calculation framework according to an embodiment. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments relate to a calculation framework. In particular embodiments, a calculation engine of the framework computes equation(s) based upon dependencies between variables, both initially input and as calculated from various sub expressions produced by fragmenting. The calculation engine accommodates relationships between equations, with output variable(s) of one equation possibly serving as input to another equation in a chain. Initially, the calculation engine sorts equations based upon their relationship to each other and to the input variables. The calculation engine next fragments the equations' expressions into various sub expressions. This fragmenting may be according to an order of operations (e.g., brackets/parentheses, then exponents/powers, then multiplication/division). Sub expressions ultimately resulting from fragmentation process, may comprise unary expressions, binary expressions, or expressions involving three or more operations at a same level of priority. Upon rationalizing an order of the fragments, the engine may evaluate units (e.g., SI and others) thereof, allowing assignment of units to output variables of the larger and more complex equations.

Figure 1:
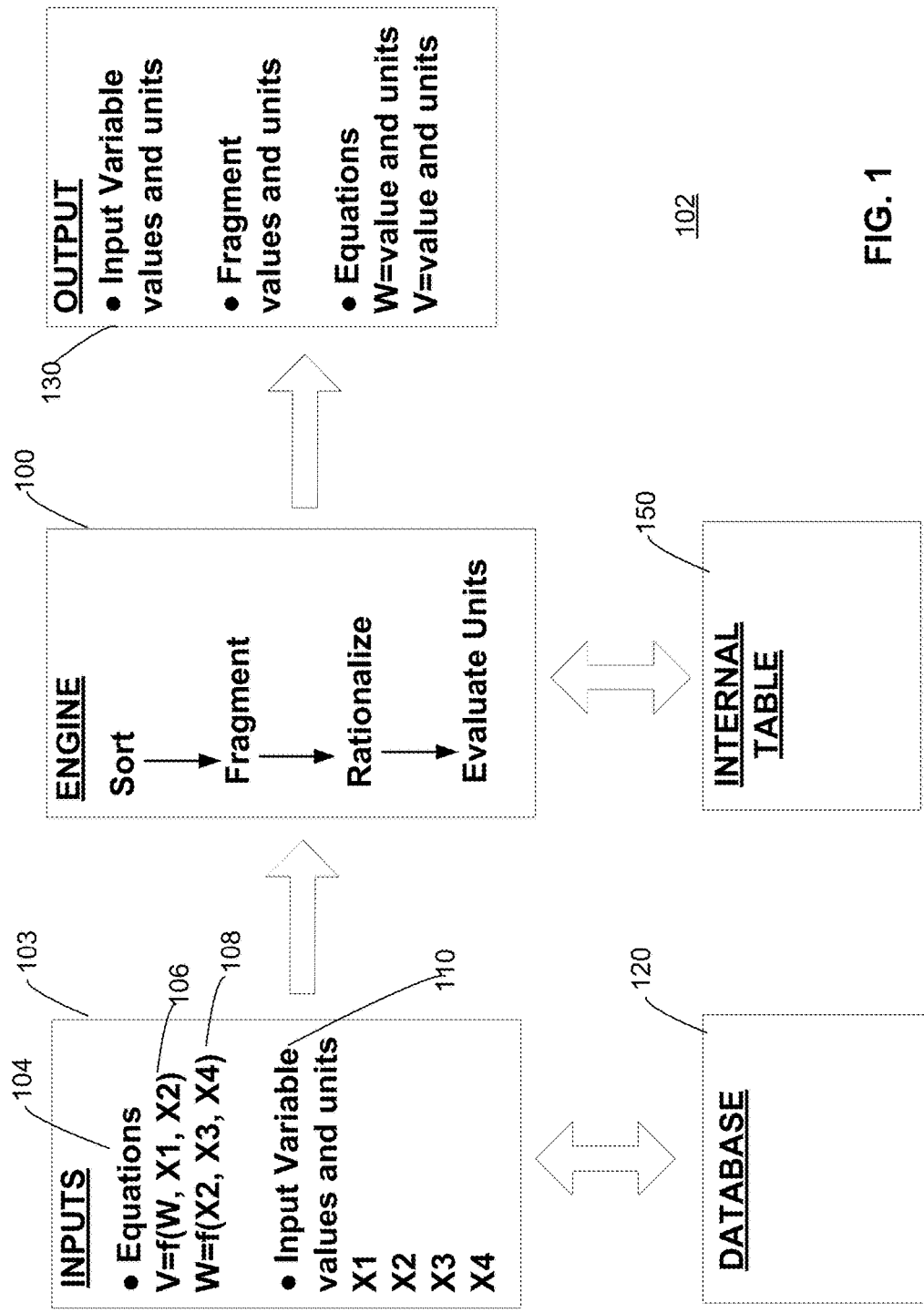
FIG. 1 is a simplified view of an embodiment of a calculation engine within a framework.

FIG. 1 is a simplified view showing an embodiment of a calculation engine 100 in a framework 102. The calculation engine is configured to receive a number of inputs 103.

A first input to the calculation engine comprises a number of equations 104, which together form a calculation chain. Here, a first equation 106 comprises an output variable V. This output variable V exhibits a dependency in the form of a mathematical function, upon other entities. In this simplified example the output variable V is based upon: the sum of the square of the output variable W of a second equation 108, and the product of a first input variable X1 and a second input variable X2. Thus, $V=W^2+X1*X2$.

The output variable W of the second equation 108 is in turn based upon: the product of the first input variable X2 and a third input variable X3, added to a fourth input variable X4. Thus, $W=X2*X3+X4$.

Each of the input variables 110 X1-X4 is also input to the calculation engine. These input variables may comprise information (e.g., metadata) in addition to their scalar numerical values. The input variables may comprise, for example, unique names assigned to the different variables (e.g., "X1"). FIG. 5 of the specific example described in detail later below, provides an exemplary table of metadata values.

Returning to FIG. 1, available metadata information of the input variables may further comprise physical unit information (e.g., length, mass, time, other, etc.) associated with respective input variables, is also input to the engine. As shown in FIG. 5 and described in connection with the particular example below, this unit information of the input variables may correspond to a unique set of dimensions (e.g., weight). Moreover, the unit information may correspond to the standard SI unit scheme (e.g., weight expressed in kilograms—KG), or may correspond to other unit schemes (e.g., weight expressed in U.S. pounds—LB).

While this particular simplified example shows metadata in the form of physical units, this is not required. The available metadata could comprise other types, for example spatial and/or temporal information in the case of vector quantities.

In representing the variables with vector quantities, each variable may possess an internal table holding input values associated with a unique identifier. This facilitates switching between different scenarios.

Take, for example, the equation: $Z=X+Y$. If X1 has a simple input value, then it will be presented to the engine with one dimensional vector that holds the input value with a unique identifier. That same unique identifier shall be used to couple the input value for the second input variable Y.

So, in this particular case: X={XValue1, Identifier1}, Y={YValue1, Identifier1} and as a result Z shall be also one dimensional vector: {ResultValue, Identifier1}. Given this, it is easy to use the same equation to feed the input variables with so called 'compositions': X={[XValue1, Identifier1], [XValue2, Identifier2],[XValue3, Identifier3]}, Y={[YValue1, Identifier1],[YValue2, Identifier2],[YValue3, Identifier3]} and finally the result Z={[ResultValue1, Identifier1],[ResultValue2, Identifier2],[ResultValue3, Identifier3]}.

Here, the 'vector' actually represents a series of couples (value, identifier) and it is up to data provisioning mechanism to assure the accurate input data for each variable in the equation. A physical unit is just another part of the variable's metadata. The vector approach affects the value representation of each variable.

The input variable value, and other information associated therewith, may be stored together in a database 120. In particular, the input variable and associated metadata may advantageously be stored in a data object having an organized structure.

Figure 2:
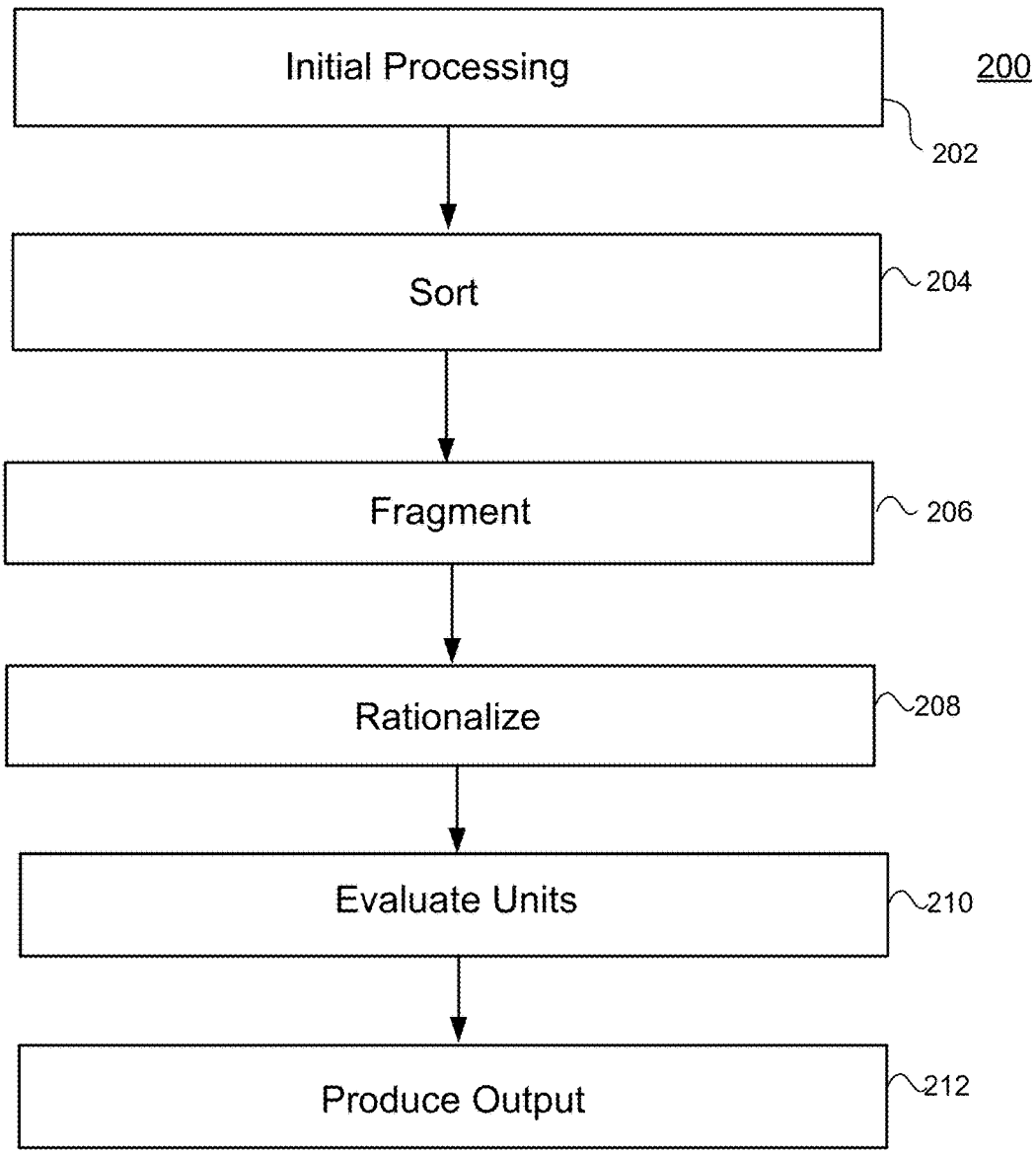
FIG. 2 is a simplified flow diagram of a process according to an embodiment.

Based upon input of the equations and the input variables, the user may seek to know the value and unit information of the output variables V and W. Accordingly, upon receipt of the inputs, the calculation engine performs the method 200 outlined in FIG. 2.

Specifically, upon receiving the inputs, as a first step 202 the engine may optionally perform some preliminary processing. This preliminary processing may comprise one or more of the following tasks.

For example, the engine may check the names of the input variables to confirm their correspondence to an appropriate naming scheme. The engine may further check that the input variables do not themselves contain mathematical operators (e.g., cosine—COS, etc.)

The engine may perform preliminary processing on the equations as well. For example, an error message may be raised by the usage of duplicate and/or unknown mathematical operators.

The engine may inspect the manner of invocation of calculation entities. For example, the engine may check for cycling dependencies between calculation entities. Thus if A and B are presented with expressions, and A uses B as an input variable in its expression, then B should not use A as an input variable in its expression, as this would lead to cycling dependencies: A depends on B and B depends on A.

Embodiments may allow a user to invoke in an expression another calculation object by its name and a set of arguments mapped with respective local (out of the current calculation object) variables. For example, a user might initially create a calculation object having the name "CYLINDER_VOLUME" and comprising input variables R, H, V, and PI.

Later, the user may again reference this calculation object in another expression using the unique name "CYLINDER_VOLUME". The user writes the name of the calculation object to be invoked, and to specify the exact match of the target's variables (in this example R and H variables) with appropriate source variables (local to the current calculation object) or even expressions {e.g., $R=Y*COS(X1)$}.

The engine may initially verify that the unit of measurement of the source variable matches the unit of measurement of the target variable. In the case of $R=Y*COS(X1)$, the engine may initially evaluate the unit of measurement of variable Y where it is in its turn a different expression. Then, the engine may evaluate the result unit of measurement of the expression Y*COS(X1) and match it with the unit of measurement of the target variable R.

In case they do not match each other, an error message should be presented. Otherwise the engine feeds the target variable R with the calculated value of the source expression or just the source value when the source is pure local variable.

Where the target calculation object possesses more than one possible outputs (each variable with an expression is actually an output) there is a mechanism to set a default output in each calculation object. Here, the default output for CYLINDER_VOLUME object is variable V.

In the local calculation object, when it comes time to invoke the target calculation object, the user may omit to specify the desired result to be calculated if that desire result is the one marked as default. Otherwise if the user wants another one (not default), it should specify it with simple pattern: 'OutputVariable=THIS', showing the engine that the concrete invocation of the target calculation object is only needed to calculate the result of variable 'OutputVariable'.

Having these prerequisites, the user may invoke the same calculation object many times with different calculated results with different source values. The user may also invoke different calculation object in one and the same local calculation object without any constrains.

This process involves an Object Oriented Calculation Execution—Encapsulation & Reuse mechanism. Here, the engine makes an initial cycling dependency check for each calculation object invoked.

Similar to the cycling dependency check of each local variable against different local expressions, the engine checks if for some reason the invoked calculation object is not using the current (host) calculation in its turn like invoking it.

This check can be done recursively to provide deep insight to any invoked calculation object. That is, there might be a situation where the invoked calculation object might invoke another calculation object inside its body, which in turn might invoke third different calculation object which might invoke the first (host) calculation object, which gives rise to a cycling dependency.

Having this Object Oriented Calculation Execution—Encapsulation & Reuse mechanism, confers freedom to encapsulate different logically connected subparts of a larger calculation scenario. This could allow reuse of any logically encapsulated object in many different places, and also assure fragmentation and clarity of representation of more complicated calculation scenarios.

According to certain embodiments, when the engine starts to execute the host calculation object, it takes other invoked calculation objects and embeds their bodies (metadata—variables with respective expressions) into the body of the current (host) object. This assures uniqueness of mixed variables (those originating from the host object and other coming from invoked objects). Thus the engine makes one big combined calculation object, which can be further sorted and fragmented once and calculated as a whole many times with different set of input values' vectors.

As described later below, certain embodiments may utilize a calculation chain including logical decisions. An example could be to perform an equation only if certain conditions are met. Accordingly, in those embodiments the preliminary processing may comprise extraction of such decisions.

A next step in the method 200 is to sort the inputs. Specifically, this sorting may be according to an order of execution of the output expressions which are part of a given calculation chain.

In particular, embodiments may allow a user the freedom to write the different constituents of a calculation entity in random way, without being concerned with a logical order of mathematical execution. Thus where an output variable A depends on another output variable B, that variable B should be calculated prior to A.

Returning to the highly simplified example of FIG. 1, the sorting produces the second equation 108 first, given its sole dependence upon only input variables X1-X3. The first equation 106 is sorted after the second equation 108, because V depends not only on input variable X1, but also on the output variable W (that is logically calculated first).

Following sorting, a next step 206 in the method 200 is to fragment constituent expressions of the equations, into a collection of simple sub expressions. In a particular embodiment, this fragmentation may atomize expressions into basic unary or binary expressions.

Here, unary refers to a simple number extracted (e.g., $-1*$) or usage of one variable in combination of mathematical function, e.g., SQRT(A), or SIN(X). Binary refers to usage of two variables with an operator between them, e.g., A+B, or $X^2$.

These atomized sub expressions resulting from the fragmentation process could be evaluated via basic mathematical operations. And, if the input constituents are actually physical quantities, their result dimensions can be evaluated in later steps.

Figure 3A:
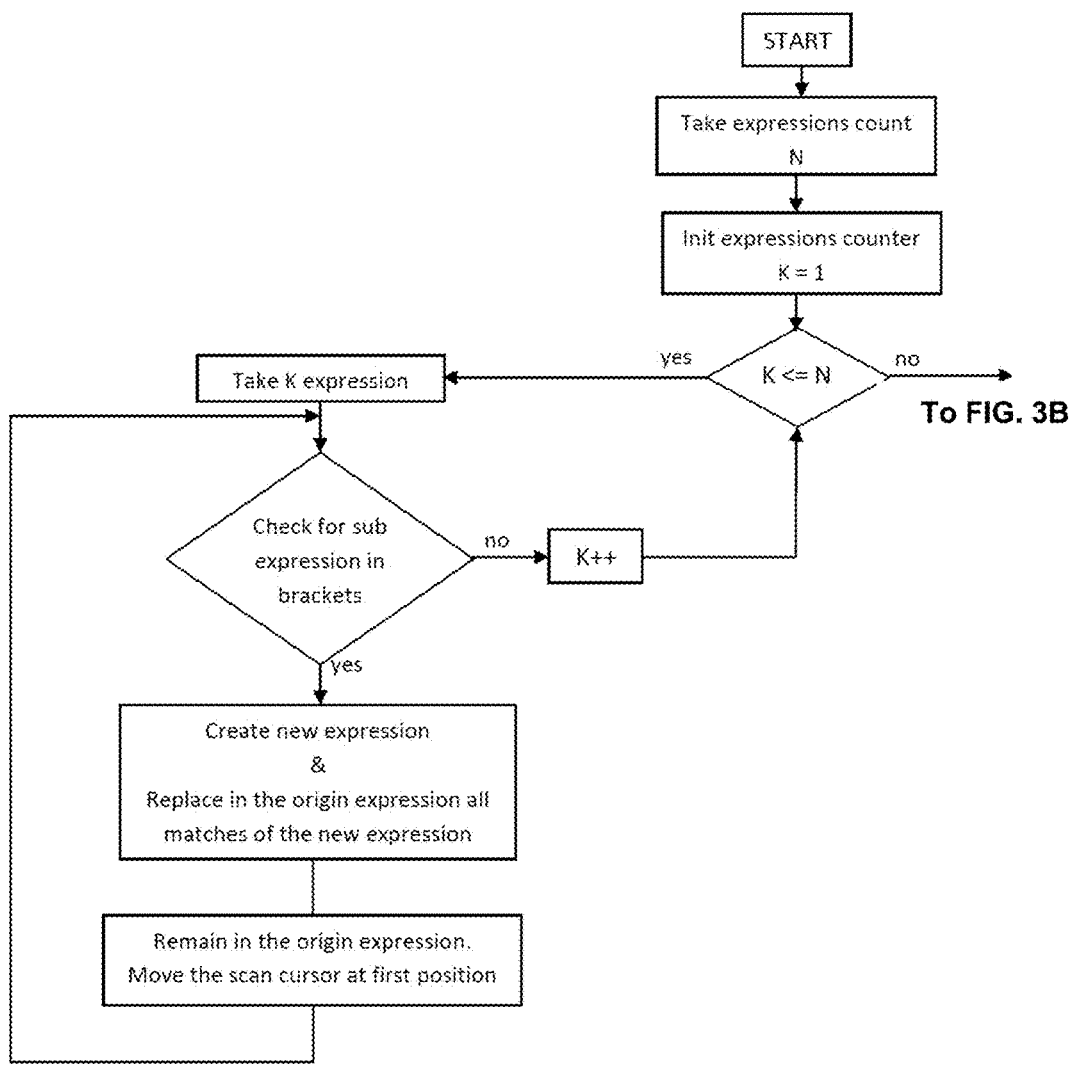
Figure 3B:
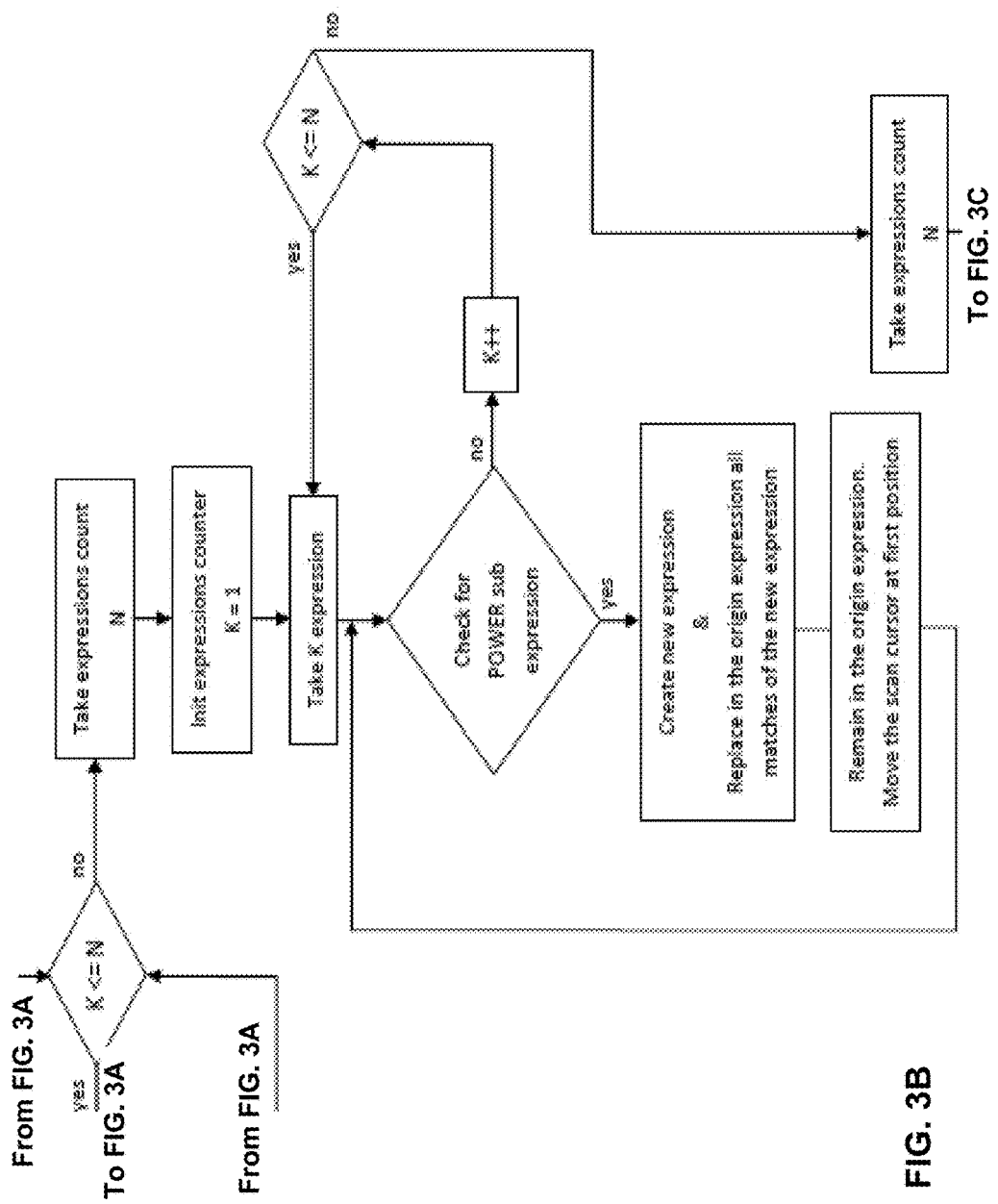

FIGS. 3A-C are simplified views of one embodiment of a fragmentation process. Specifically, to ensure that even the most complicated mathematical expressions have the same meaning, the following rule is observed for fragmenting. For numerical or algebraic expressions, the order of evaluation is as follows.

1. Parentheses or brackets are addressed first, starting with the innermost. This is shown in FIG. 3A.
2. Exponentials or powers are addressed next. This is shown in FIG. 3B.
3. Multiplications and divisions are addressed next. This is shown in FIG. 3C.
4. Additions and subtractions are addressed last.
5. If an expression involves three or more operations at the same level of priority, those operations are performed from left to right.

In the simple example of FIG. 1, fragmentation of the first sorted equation W:

$$W=X2*X3+X4$$

produces the following sub expressions, named with a service (reserved) suffix V@R_n concatenated with an incrementing number which assures uniqueness of the given name:

- $V@R\_1=X2*X3$

Accordingly, the equation for the output variable W, can be expressed as:

$$W=V@R\_1+X4.$$

Similarly, fragmentation of the expressions of the second sorted equation for the output variable V, can result in generation of additional sub expressions, e.g., ●V@R_2, ●V@R_3, etc. Further details regarding the fragmentation process will be evident upon review of the detailed example provided below.

Following fragmentation, the next step 208 in method 200 is rationalization. In particular, rationalization involves ordering the fragments in a proper way for evaluation of their dimensions and for value calculation. An example of rationalization is also provided later below in the example.

Following rationalization, the next step 210 in method 200 is to evaluate the units. This involves calculation of fragmentized sub expressions, and executing decisions (if present). Based upon the units of the input variables, units are assigned to sub expressions, and therefrom assigned to the larger expressions of equations in the calculation chain. As shown in FIG. 1 and described later below, in certain embodiments this and other steps may involve an internal table 150.

In a final step 212 of the method, output 130 of the engine is produced and displayed to a user. This output may comprise representing in an appropriate list, data and corresponding metadata of the input variables, calculated subparts (fragments), and/or output variables, for inspection by the user.

In a particular embodiment the given result list may present output in tabular form, with rows corresponding to different input variables, fragmented sub expressions, expressions, formulas, and culminating in output variables. Columns of the display table can correspond to numerical values, as well as to specific metadata such as name, unit, etc.

Presented in this manner to a user, the expressions of the output variables are less complex, affording an ordinary user with the ability to understand them in an intuitive manner. As they are specially prepared in advance to have meaningful final dimensions—the engine manages to evaluate them, otherwise exceptions may be provided in a column of the result list.

Figure 4:
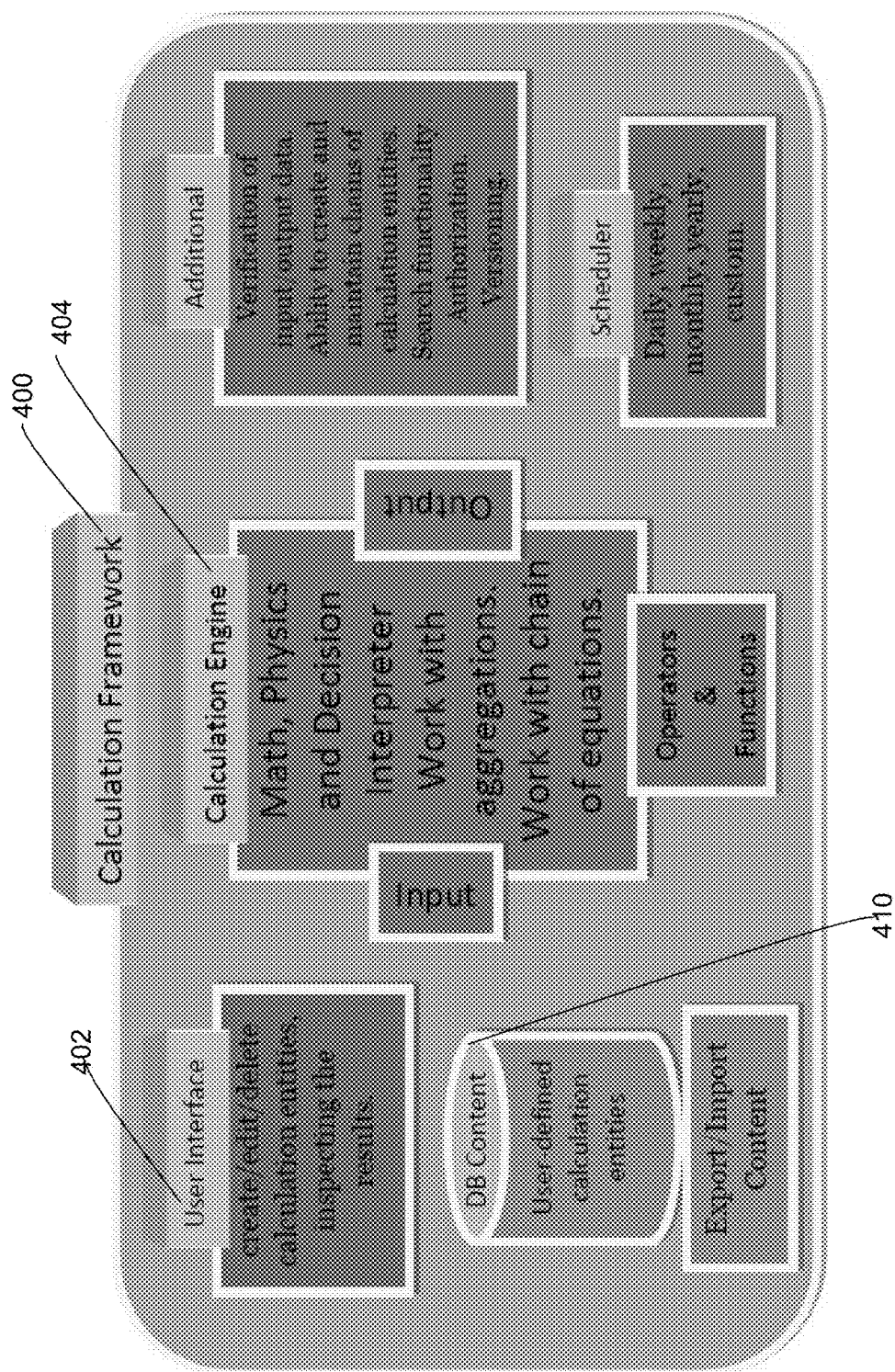
FIG. 4 is a simplified view of a calculation framework according to an embodiment.

In an embodiment, the output may be displayed via a user interface (UI). FIG. 4 shows a simplified view of a calculation framework 400 comprising such a user interface 402 as well as the calculation engine 404.

The UI may be user friendly for creating/editing/deleting formulas. It may also allow the user to inspect the results and simulate the process of executing the calculation with some custom entered input data in a single or mass mode.

The units of measurements of input variables (those without expressions) are part of the origin metadata and are not meant to change during the calculation. In certain embodiments fragmentation and dimension evaluation of all output variables (those with expressions) is made at the beginning of calculation process, and then the calculation of results values take place as many times as the size of input series with couples (InputValue, Identifier) for each input variable. This is so called 'mass mode' may significantly improve performance.

According to embodiments, adjustments to the formula can be made quickly using a normal data entry screen instead of requiring an expert programmer to go into the source code, then amend, compile and release it—a time-consuming and expensive process.

In addition, the calculation framework 400 of FIG. 4 shows other possible elements. Examples of such elements can include but are not limited to those implementing functions such as scheduling, archiving, versioning, error handling, etc.

Further details regarding decision support are now provided in connection with the following specific example.

EXAMPLE

An example illustrating implementation of a calculation framework according to an embodiment, is now presented in connection with several complex expressions as given below. In particular, a calculation chain comprises the following specific four (4) equations for output variables (V, W, Z, and Y) that are based upon a set of initial variables (X1-X14).

● $V = W*X3 + X3\hat{\,}3$

● $W = Z/Y*X7\hat{\,}3$

● $Z = (X1/3.5\hat{\,}X9*(X4\hat{\,}(-1)+X7*12.4/Y))/X5+(LOG((-1)*X6*(Y*12.34*X7\hat{\,}(-2))+X8*(X4-(X5\hat{\,}((23.02+456.98)/(6.87225/3.234+477.875))/X5)/X8))-COS(222.22-(X7/Y*X4)))*X13/123.321$ ● $Y = (-X1*X7/X5*X4) + (-666.456*X10 - (1/X6\hat{\,}X9/X7\hat{\,}(-1))\hat{\,}(-1))*((X3*X4\hat{\,}-3)\hat{\,}(-1)) + ((X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3\hat{\,}3/X8*X11/X12*X13*X9))/X2))$ Here, * is a symbol for multiplication, / is a symbol for division, and ^ is a symbol for power math operation.

The fourteen different input variables X1-X14, together with metadata associated therewith, are described in the table shown in FIG. 5. Attributes such as input Name, Given Unit, Unit Description, SI Unit, SI Unit Description, and Dimension are listed.

The input variables with no unit defined are just pure digits—dimensionless variables. Variables which possess units are physical quantities.

The user may provide as metadata for each input variable—a name, a unit of measurement (if the variable is physical quantity) and series of input values (one or many). Details about the given unit of measurement as Unit Description, SI Unit, SI Unit Description, and Dimension are evaluated by the engine and are primarily used in internal processes. If the user seeks additional information about the used unit of measurement of the input variables or the evaluated unit of measurement of any result variable, the engine can provide it.

In certain embodiments the data and metadata may be stored in an organized manner in a database table utilizing an organized, multi-faceted data structure (e.g., data object) of the database. Such a database 410 is reflected in the framework of FIG. 4, as well.

It may be desirable for an ordinary user to be able to quickly understand the physical dimensions and/or specific units of each of the expressions V, W, Z, and Y. However given factors such as the complexity of the defining equations, their relationships with each other, their use of input variables of different dimensions, and their use of input variables representing the same physical dimension but in different units, such a task may be beyond the intuitive grasp of any but the most sophisticated users.

Accordingly, in this example it is the goal of the calculation engine to quickly provide a user with not only the values of the various initial expressions V, W, Z, and Y, but also their dimensions and units. The engine can also check the given expressions from physical correctness perspective, and alert the user if any of the given expressions is initially wrongly written.

As described extensively above, before starting to evaluate the physical dimensions, the input equations are first sorted according to an order of their execution in a given calculation chain. Here, the output variable V is in terms of W, which is in terms of Z, which is in terms of Y. The output variable Y is solely in terms of the input variables X1-X14. Accordingly, the result of the sorting step is: Y, Z, W, V.

Next, in their sorted order, expressions of the initial equations are fragmented into the following simple sub expressions:
- unary expressions
- binary expressions, or
- expressions involving three or more operations at a same level of priority.

Starting with the innermost, fragments are distinguished in brackets in separate sub expressions. The new sub expressions derived by fragmentation, are named as "V@R_i", where i is an incrementing number designating a unique name for the sub-expression.

Fragmented first, are expressions of the equation for Y (the first sorted):

$$Y=(-X1*X7/X5*X4)+(-666.456*X10-(1/X6^X9/X7^(-1))^(-1)*((X3*X4^-3)^(-1))+((X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

As detailed in the following sequence, fragmentation of the expressions of the equation for the output variable Y according to brackets/parentheses (starting with the innermost) results in eighteen (18) sub-expressions ●V@R_1-●V@R_18.

● $V@R\_1=(-X1*X7/X5*X4)$, allowing Y to be rewritten as:

$$Y=V@R\_1+(-666.456*X10-(1/X6^X9/X7^(-1))^(-1)*((X3*X4^-3)^(-1))+((X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_2=(-1)$ $$Y=V@R\_1+(-666.456*X10-(1/X6^X9/X7^V@R\_2)^V@R\_2*((X3*X4^-3)^V@R\_2)+((X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_3=(1/X6^X9/X7^V@R\_2)$ $$Y=V@R\_1+(-666.456*X10-V@R\_3\ ^V@R\_2*((X3*X4^-3)^V@R\_2)+((X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_4=(X3*X4^-3)$ $$Y=V@R\_1+(-666.456*X10-V@R\_3^V@R\_2*(V@R\_4\ ^V@R\_2)+((X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_5=(V@R\_4^V@R\_2)$ $$Y=V@R\_1+(-666.456*X10-V@R\_3\ ^V@R\_2*V@R\_5+4X4/X2*X3/16.61)/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_6=(X4/X2*X3/16.61)$ $$Y=V@R\_1+(-666.456*X10-V@R\_3\ ^V@R\_2*V@R\_5+(V@R\_6/(-1/(X2*X4)-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_7=(X2*X4)$ $$Y=V@R\_1+(-666.456*X10-V@R\_3\ ^V@R\_2*V@R\_5+(V@R\_64-1/V@R\_7-X3/(X7*12.34)-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_8=(X7*12.34)$ $$Y=V@R\_1+(-666.456*X10-V@R\_3\ ^V@R\_2*V@R\_5+(V@R\_64-1/V@R\_7-X3/V@R\_8-X5/(X1*X4)))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_9=(X1*X4)$ $$Y=V@R\_1+(-666.456*X10-V@R\_3\ ^V@R\_2*V@R\_5+(V@R\_64-1/V@R\_7-X3/V@R\_8-X5/V@R\_9))*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_10=(-1/V@R\_7-X3/V@R\_8-X5/V@R\_9)$ $$Y=V@R\_1+(-666.456*X10-V@R\_3^V@R\_2*V@R\_5+(V@R\_6/V@R\_10)*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_11=(V@R\_6/V@R\_10)$ $$Y=V@R\_1+(-666.456*X10-V@R\_3\ ^V@R\_2*V@R\_5+V@R\_11*(10.1+((-X8*X4-X2-X2+X4*X8+X2+X9)+ABS(11.25/22.6-33.22)-(X1*X4*X3^3/X8*X11/X12*X13*X9))/X2))$$

● $V@R\_12=(-X8*X4-X2-X2+X4*X8+X2+X9)$ $$Y=V@R\_1+(-666.456*X10-V@R\_3^V@R\_2*V@R\_5+V@R\_11*(10.1+(V@R\_12+ABS(11.25/22.6-33.22)-(X1*X4*X3^3/X8*X11/X12*X13*X9))/X2))$$

● $V@R\_13=11.25/22.6-33.22$ $$Y=V@R\_1+(-666.456*X10-V@R\_3^V@R\_2*V@R\_5+V@R\_11*(10.1+(V@R\_12+ABS(V@R\_13)-(X1*X4*X3^3/X8*X11/X12*X13*X9))/X2))$$

● $V@R\_14=ABS(V@R\_13)$ $$Y=V@R\_1+(-666.456*X10-V@R\_3\ ^V@R\_2*V@R\_5+V@R\_11*(10.1+(V@R\_12+V@R\_14-(X1*X4*X3^3/X8*X11/X12*X13*X9))/X2))$$

● $V@R\_15=(X1*X4*X3^3/X8*X11/X12*X13*X9)$ $$Y=V@R\_1+(-666.456*X10-V@R\_3^V@R\_2*V@R\_5+V@R\_11*(10.1+(V@R\_12+V@R\_14-V@R\_15)/X2))$$

●$V@R\_16=(V@R\_12+V@R\_14-V@R\_15)$ $Y=V@R\_1+(-666.456*X10-V@R\_3\hat{}V@R\_2*V@R\_5+V@R\_11*(10.1+V@R\_16/X2))$

●$V@R\_17=(10.1+V@R\_16/X2)$ $Y=V@R\_1+(-666.456*X10-V@R\_3\hat{}V@R\_2*V@R\_5+V@R\_11*V@R\_17)$ ●$V@R\_18=(-666.456*X10-V@R\_3\hat{}V@R\_2*V@R\_5+V@R\_11*V@R\_17)$ $Y=V@R\_1+V@R\_18$ The initial expression Z is the next sorted (it utilizes only Y and various input variables).

$Z=(X1/3.5\hat{}X9*(X4\hat{}(-1)+X7*12.4/Y))/X5+(LOG((-1)*X6*(Y*12.34*X7\hat{}(-2))+X8*(X4-(X5\hat{}((23.02+456.98)/(6.87225/3.234+477.875))/X5)/X8))-COS(222.22-(X7/Y*X4)))*X13/123.321$ Fragmentation of the expressions of this initial equation for the output variable Z according to brackets/parentheses (from the innermost) results in some of the previously defined sub-expressions, plus an additional fifteen (15) new sub-expressions: V@R_19–V@R_33. This is detailed in the following sequence.

$V@R\_2=(-1)$, allowing Z to be rewritten as:

$Z=(X1/3.5\hat{}X9*(X4\hat{}V@R\_2+X7*12.4/Y))/X5+(LOG(V@R\_2*X6*(Y*12.34*X7\hat{}(-2))+X8*(X4-(X5\hat{}((23.02+456.98)/(6.87225/3.234+477.875))/X5)/X8))-COS(222.22-(X7/Y*X4)))*X13/123.321$ ●$V@R\_19=(X4\hat{}V@R\_2+X7*12.4/Y)$ $Z=(X1/3.5\hat{}X9*V@R\_19)/X5+(LOG(V@R\_2*X6*(Y*12.34*X7\hat{}(-2))+X8*(X4-(X5\hat{}((23.02+456.98)/(6.87225/3.234+477.875))/X5)/X8))-COS(222.22-(X7/Y*X4)))*X13/123.321$ ●$V@R\_20=(X1/3.5\hat{}X9*V@R\_19)$ $Z=V@R\_20/X5+(LOG(V@R\_2*X6*(Y*12.34*X7\hat{}(-2))+X8*(X4-(X5\hat{}((23.02+456.98)/(6.87225/3.234+477.875))/X5)/X8))-COS(222.22-(X7/Y*X4)))*X13/123.321$

●$V@R\_21=(-2)$ $Z=V@R\_20/X5+(LOG(V@R\_2*X6*(Y*12.34*X7\hat{}V@R\_21)+X8*(X4-(X5\hat{}((23.02+456.98)/(6.87225/3.234+477.875))/X5)/X8))-COS(222.22-(X7/Y*X4)))*X13/123.321$ ●$V@R\_22=(Y*12.34*X7\hat{}V@R\_21)$ $Z=V@R\_20/X5+(LOG(V@R\_2*X6*V@R\_22+X8*(X4-(X5\hat{}((23.02+456.98)/(6.87225/3.234+477.875))/X5)/X8))-COS(222.22-(X7/Y*X4)))*X13/123.321$

●$V@R\_23=(23.02+456.98)$ $Z=V@R\_20/X5+(LOG(V@R\_2*X6*V@R\_22+X8*(X4-(X5\hat{}(V@R\_23/(6.87225/3.234+477.875))/X5)/X8))-COS(222.22-(X7/Y*X4)))*X13/123.321$

●$V@R\_24=(6.87225/3.234+477.875)$ $Z=V@R\_20/X5+(LOG(V@R\_2*X6*V@R\_22+X8*(X4-(X5\hat{}(V@R\_23/V@R\_24)/X5)/X8))-COS(222.22-(X7/Y*X4)))*X13/123.321$

●$V@R\_25=(V@R\_23/V@R\_24)$ $Z=V@R\_20/X5+(LOG(V@R\_2*X6*V@R\_22+X8*(X4-(X5\hat{}V@R\_25/X5)/X8))-COS(222.22-(X7/Y*X4)))*X13/123.321$ ●$V@R\_26=(X5\hat{}V@R\_25/X5)$ $Z=V@R\_20/X5+(LOG(V@R\_2*X6*V@R\_22+X8*(X4-V@R\_26/X8))-COS(222.22-(X7/Y*X4)))*X13/123.321$

●$V@R\_27=(X4-V@R\_26/X8)$ $Z=V@R\_20/X5+(LOG(V@R\_2*X6*V@R\_22+X8*V@R\_27)-COS(222.22-(X7/Y*X4)))*X13/123.321$

●$V@R\_28=V@R\_2*X6*V@R\_22+X8*V@R\_27$ $Z=V@R\_20/X5+(LOG(V@R\_28)-COS(222.22-(X7/Y*X4)))*X13/123.321$

●$V@R\_29=LOG(V@R\_28)$ $Z=V@R\_20/X5+(V@R\_29-COS(222.22-(X7/Y*X4)))*X13/123.321$

●$V@R\_30=(X7/Y*X4)$ $Z=V@R\_20/X5+(V@R\_29-COS(222.22-V@R\_30))*X13/123.321$

●$V@R\_31=222.22-V@R\_30$ $Z=V@R\_20/X5+(V@R\_29-COS(V@R\_31))*X13/123.321$

●$V@R\_32=COS(V@R\_31)$ $Z=V@R\_20/X5+(V@R\_29-V@R\_32)*X13/123.321$

●$V@R\_33=(V@R\_29-V@R\_32)$ $Z=V@R\_20/X5+V@R\_33*X13/123.321$

Neither of the remaining sorted initial equations (W or V) utilizes brackets. Accordingly, their expressions remain unchanged.

A next step of the fragmentation process is to distinguish fragments with exponentials or powers in separate sub expressions. Together with the initial four input equations for the output variables (Y, Z, W, V), the additional thirty-three (33) sub expressions derived above are evaluated in this manner.

The following sequence details fragmentation of only those expressions possessing 'exponentials' or 'powers', into an additional eleven (11) new sub expressions:

●$V@R\_34-●V@R\_44.$ $V@R\_3=1/X6\hat{}X9/X7\hat{}V@R\_2$

●$V@R\_34=X6\hat{}X9$ $V@R\_3=1/V@R\_34/X7\hat{}V@R\_2$

●$V@R\_35=X7\hat{}V@R\_2$ $V@R\_3=1/V@R\_34/V@R\_35$ $V@R\_4=X3*X4\hat{}-3$

- $V@R\_36 = X4^3$

- $V@R\_37 = 1/V@R\_36$ $V@R\_4 = X3 * V@R\_37$ $V@R\_15 = X1 * X4 * X3^3 / X8 * X11 / X12 * X13 * X9$

- $V@R\_38 = X3^3$ $V@R\_15 = X1 * X4 * V@R\_38 / X8 * X11 / X12 * X13 * X9$ $V@R\_18 = -666.456 * X10 - V@R\_3 \hat{\ } V@R\_2 * V@R\_5 + V@R\_11 * V@R\_17$

- $V@R\_39 = V@R\_3 \hat{\ } V@R\_2$ $V@R\_18 = -666.456 * X10 - V@R\_39 * V@R\_5 + V@R\_11 * V@R\_17$ $V@R\_19 = X4 \hat{\ } V@R\_2 + X7 * 12.4 / Y$

- $V@R\_40 = X4 \hat{\ } V@R\_2$ $V@R\_19 = V@R\_40 + X7 * 12.4 / Y$ $V@R\_20 = X1 / 3.5 \hat{\ } X9 * V@R\_19$

- $V@R\_41 = 3.5 \hat{\ } X9$ $V@R\_20 = X1 / V@R\_41 * V@R\_19$ $V@R\_22 = Y * 12.34 * X7 \hat{\ } V@R\_21$

- $V@R\_42 = X7 \hat{\ } V@R\_21$ $V@R\_22 = Y * 12.34 * V@R\_42$ $V@R\_26 = X5 \hat{\ } V@R\_25 / X5$

- $V@R\_43 = X5 \hat{\ } V@R\_25$ $V@R\_26 = V@R\_43 / X5$ $W = Z / Y * X7^3$

- $V@R\_44 = X7^3$ $W = Z / Y * V@R\_44$ $V = W * X3 + X3^3$

- $V@R\_38 = X3^3$ $V = W * X3 + V@R\_38$

A next step of the fragmentation process is to distinguish fragments with multiplications and divisions in separate sub expressions. Together with the initial four input equations corresponding to the output variables (Y, Z, W, V), the additional forty-four (44) sub expressions derived above are evaluated in this manner.

The following sequence details fragmentation of only those expressions possessing 'multiplications' or 'divisions' inside 'exponentials' or 'powers', into an additional thirty-six (36) new sub expressions:

- $V@R\_45 - \bullet V@R\_80$.

$V@R\_1 = -X1 * X7 / X5 * X4$

- $V@R\_45 = X1 * X7$ $V@R\_1 = -V@R\_45 / X5 * X4$

- $V@R\_46 = V@R\_45 / X5$ $V@R\_1 = -V@R\_46 * X4$

- $V@R\_47 = V@R\_46 * X4$ $V@R\_1 = -V@R\_47$ $V@R\_3 = 1 / V@R\_34 / V@R\_35$

- $V@R\_48 = 1 / V@R\_34$ $V@R\_3 = V@R\_48 / V@R\_35$ $V@R\_6 = X4 / X2 * X3 / 16.61$

- $V@R\_49 = X4 / X2$ $V@R\_6 = V@R\_49 * X3 / 16.61$

- $V@R\_50 = V@R\_49 * X3$ $V@R\_6 = V@R\_50 / 16.61$ $V@R\_10 = -1 / V@R\_7 - X3 / V@R\_8 - X5 / V@R\_9$

- $V@R\_51 = -1 / V@R\_7$ $V@R\_10 = V@R\_51 - X3 / V@R\_8 - X5 / V@R\_9$

- $V@R\_52 = X3 / V@R\_8$ $V@R\_10 = V@R\_51 - V@R\_52 - X5 / V@R\_9$

- $V@R\_53 = X5 / V@R\_9$ $V@R\_10 = V@R\_51 - V@R\_52 - V@R\_53$ $V@R\_12 = -X8 * X4 - X2 - X2 + X4 * X8 + X2 + X9$

- $V@R\_54 = X8 * X4$ $V@R\_12 = -V@R\_54 - X2 - X2 + X4 * X8 + X2 + X9$

- $V@R\_55 = X4 * X8$ $V@R\_12 = -V@R\_54 - X2 - X2 + V@R\_55 + X2 + X9$ $V@R\_13 = 11.25 / 22.6 - 33.22$

- $V@R\_56 = 11.25 / 22.6$ $V@R\_13 = V@R\_56 - 33.22$ $V@R\_15 = X1 * X4 * V@R\_38 / X8 * X11 / X12 * X13 * X9$ $V@R\_9 = X1 * X4$ $V@R\_15 = V@R\_9 * V@R\_38 / X8 * X11 / X12 * X13 * X9$

- $V@R\_57 = V@R\_9 * V@R\_38$ $V@R\_15 = V@R\_57 / X8 * X11 / X12 * X13 * X9$

- $V@R\_58 = V@R\_57 / X8$ $V@R\_15 = V@R\_58 * X11 / X12 * X13 * X9$

- $V@R\_59 = V@R\_58 * X11$ $V@R\_15 = V@R\_59 / X12 * X13 * X9$

● $V@R\_60 = V@R\_59/X12$ $V@R\_15 = V@R\_60*X13*X9$

● $V@R\_61 = V@R\_60*X13$ $V@R\_15 = V@R\_61*X9$ $V@R\_17 = 10.1 + V@R\_16/X2$

● $V@R\_62 = V@R\_16/X2$ $V@R\_17 = 10.1 + V@R\_62$ $V@R\_18 = -666.456*X10 - V@R\_39*V@R\_5 + V@R\_11*V@R\_17$

● $V@R\_63 = -666.456*X10$ $V@R\_18 = V@R\_63 - V@R\_39*V@R\_5 + V@R\_11*V@R\_17$

● $V@R\_64 = V@R\_39*V@R\_5$ $V@R\_18 = V@R\_63 - V@R\_64 + V@R\_11*V@R\_17$

● $V@R\_65 = V@R\_11*V@R\_17$ $V@R\_18 = V@R\_63 - V@R\_64 + V@R\_65$ $V@R\_19 = V@R\_40 + X7*12.4/Y$

● $V@R\_66 = X7*12.4$ $V@R\_19 = V@R\_40 + V@R\_66/Y$

● $V@R\_67 = V@R\_66/Y$ $V@R\_19 = V@R\_40 + V@R\_67$ $V@R\_20 = X1/V@R\_41*V@R\_19$

● $V@R\_68 = X1/V@R\_41$ $V@R\_20 = V@R\_68*V@R\_19$ $V@R\_22 = Y*12.34*V@R\_42$

● $V@R\_69 = Y*12.34$ $V@R\_22 = V@R\_69*V@R\_42$ $V@R\_24 = 6.87225/3.234 + 477.875$

● $V@R\_70 = 6.87225/3.234$ $V@R\_24 = V@R\_70 + 477.875$ $V@R\_27 = X4 - V@R\_26/X8$

● $V@R\_71 = V@R\_26/X8$ $V@R\_27 = X4 - V@R\_71$ $V@R\_28 = V@R\_2*X6*V@R\_22 + X8*V@R\_27$

● $V@R\_72 = V@R\_2*X6$ $V@R\_28 = V@R\_72*V@R\_22 + X8*V@R\_27$

● $V@R\_73 = V@R\_72*V@R\_22$ $V@R\_28 = V@R\_73 + X8*V@R\_27$

● $V@R\_74 = X8*V@R\_27$ $V@R\_28 = V@R\_73 - FV@R\_74$ $V@R\_30 = X7/Y*X4$

● $V@R\_75 = X7/Y$ $V@R\_30 = V@R\_75*X4$ $Z = V@R\_20/X5 + V@R\_33*X13/123.321$

● $V@R\_76 = V@R\_20/X5$ $Z = V@R\_76 + V@R\_33*X13/123.321$

● $V@R\_77 = V@R\_33*X13$ $Z = V@R\_76 + V@R\_77/123.321$

● $V@R\_78 = V@R\_77/123.321$ $Z = V@R\_76 + V@R\_78$ $W = Z/Y*V@R\_44$

● $V@R\_79 = Z/Y$ $W = V@R\_79*V@R\_44$ $V = W*X3 + V@R\_38$

● $V@R\_80 = W*X3$ $V = V@R\_80 + V@R\_38$

The conclusion of the fragmentation process results in the initial equations for the output variables (Y, Z, W, V) being in terms of the addition or subtraction of: input variables (X1-X14), and simple unary sub expressions, binary sub expressions, or sub expressions involving three or more operations at a same level of priority (●$V@R\_1$-●$V@R\_80$).

As described above, the fragmentation process is strictly concerned with atomizing expressions according to mathematical operations. This fragmentation process does not consider the characteristic of units assigned to variables and the equations/expressions/sub expressions derived therefrom.

Accordingly, a next step is to rationalize these fragments in a proper way for evaluation of their dimensions and value calculation. Here, the result of this rationalization is given below.

The following is the precise order the engine shall follow to execute all chain of expressions. This assures that for every next pending equation to be calculated, all needed information is already calculated and loaded into the memory of the engine.

X3 [Length]
X7 [Speed]
X1 [Mass]
X2
X4 [Frequency]
X5 [Mass]
X6 [Length]
X8 [Time]
X9
X10 [Acceleration]

X11 [Particle concentration]
X12 [Mass flow]
X13 [Time]
X14

$V@R\_45 = X1*X7$ $V@R\_46 = V@R\_45/X5$ $V@R\_47 = V@R\_46*X4$ $V@R\_1 = -V@R\_47$ $V@R\_2 = -1$ $V@R\_34 = X6\hat{}X9$ $V@R\_35 = X7\hat{}V@R\_2$ $V@R\_48 = 1/V@R\_34$ $V@R\_3 = V@R\_48/V@R\_35$ $V@R\_36 = X4\hat{}3$ $V@R\_37 = 1/V@R\_36$ $V@R\_4 = X3*V@R\_37$ $V@R\_5 = V@R\_4\hat{}V@R\_2$ $V@R\_49 = X4/X2$ $V@R\_50 = V@R\_49*X3$ $V@R\_6 = V@R\_50/16.61$ $V@R\_7 = X2*X4$ $V@R\_8 = X7*12.34$ $V@R\_9 = X1*X4$ $V@R\_51 = -1/V@R\_7$ $V@R\_52 = X3/V@R\_8$ $V@R\_53 = X5/V@R\_9$ $V@R\_10 = V@R\_51 - V@R\_52 - V@R\_53$ $V@R\_11 = V@R\_6/V@R\_10$ $V@R\_54 = X8*X4$ $V@R\_55 = X4*X8$ $V@R\_12 = -V@R\_54 - X2 - X2 + V@R\_55 + X2 + X9$ $V@R\_56 = 11.25/22.6$ $V@R\_13 = V@R\_56 - 33.22$ $V@R\_14 = ABS(V@R\_13)$ $V@R\_38 = X3\hat{}3$ $V@R\_57 = V@R\_9*V@R\_38$ $V@R\_58 = V@R\_57/X8$ $V@R\_59 = V@R\_58*X11$ $V@R\_60 = V@R\_59/X12$ $V@R\_61 = V@R\_60*X13$ $V@R\_15 = V@R\_61*X9$ $V@R\_16 = V@R\_12 + V@R\_14 - V@R\_15$ $V@R\_62 = V@R\_16/X2$ $V@R\_17 = 10.1 + V@R\_62$ $V@R\_39 = V@R\_3\hat{}V@R\_2$ $V@R\_63 = -666.456*X10$ $V@R\_64 = V@R\_39*V@R\_5$ $V@R\_65 = V@R\_11*V@R\_17$ $V@R\_18 = V@R\_63 - V@R\_64 + V@R\_65$ $Y = V@R\_1 + V@R\_18$ $V@R\_40 = X4\hat{}V@R\_2$ $V@R\_66 = X7*12.4$ $V@R\_67 = V@R\_66/Y$ $V@R\_19 = V@R\_40 + V@R\_67$ $V@R\_41 = 3.5\hat{}X9$ $V@R\_68 = X1/V@R\_41$ $V@R\_20 = V@R\_68*V@R\_19$ $V@R\_21 = -2$ $V@R\_42 = X7\hat{}V@R\_21$ $V@R\_69 = Y*12.34$ $V@R\_22 = V@R\_69*V@R\_42$ $V@R\_23 = 23.02 + 456.98$ $V@R\_70 = 6.87225/3.234$ $V@R\_24 = V@R\_70 + 477.875$ $V@R\_25 = V@R\_23/V@R\_24$ $V@R\_43 = X5\hat{}V@R\_25$ $V@R\_26 = V@R\_43/X5$ $V@R\_71 = V@R\_26/X8$ $V@R\_27 = X4 - V@R\_71$ $V@R\_72 = V@R\_2*X6$ $V@R\_73 = V@R\_72*V@R\_22$ $V@R\_74 = X8*V@R\_27$ $V@R\_28 = V@R\_73 + V@R\_74$ $V@R\_29 = LOG(V@R\_28)$ $V@R\_75 = X7/Y$ $V@R\_30 = V@R\_75*X4$ $V@R\_31 = 222.22 - V@R\_30$ $V@R\_32 = COS(V@R\_31)$ $V@R\_33 = V@R\_29 - V@R\_32$ $V@R\_76 = V@R\_20/X5$ $V@R\_77 = V@R\_33 * X13$ $V@R\_78 = V@R\_77/123.321$ $Z = V@R\_76 + V@R\_78$ $V@R\_44 = X7^3$ $V@R\_79 = Z/Y$ $W = V@R\_79 * V@R\_44$ $V@R\_80 = W * X3$ $V = V@R\_80 + V@R\_38$ Following this rationalization, units can be evaluated and assigned to provide the final output. Specifically, the International System of Units (SI) defines seven dimensionally independent SI base units according to the following table:

| THING MEASURED | NAME OF SI | SYMBOL OF SI |
| --- | --- | --- |
| Length | meter | m |
| Mass | kilogram | kg |
| Time | second | s |
| Electric Current | ampere | A |
| Temperature | kelvin | K |
| Amount of Thing | mole | mol |
| Light Intensity | candela | cd |

All physical quantities can be expressed by these base units. Hence, nature can be considered to consist of seven fundamental physical constants expressed in SI units.

Each unit can be presented as a combination of all seven fundamental physical constants, having their numbers of degrees for each constituent in the combined unit formula. The position of the constant in the formula may be respected either in the numerator (having a sign +) or in the denominator (having a sign −).

As an example, pressure is the ratio of force to the area over which that force is distributed. Pressure can be expressed as: N/m^2 (newton per square meter), or kg/(m*s^2) (kilogram per product of meter and square seconds).

While 'kg', 'm' and 's' are basic SI units, the unit of pressure can be presented with the following array:

| meter | kilogram | second | ampere | kelvin | mole | candela |
| --- | --- | --- | --- | --- | --- | --- |
| −1 | 1 | −2 | 0 | 0 | 0 | 0 |

This results in: 'kg' of first degree in the numerator (expressed with 1); 'm' of first degree in the denominator (expressed with −1); and 's' of second degree in the denominator (expressed with −2).

Multiplication and division of different units of measurement can be expressed with the help of aforementioned array. For example length can be presented as:

| meter | kilogram | second | ampere | kelvin | mole | candela |
| --- | --- | --- | --- | --- | --- | --- |
| 1 | 0 | 0 | 0 | 0 | 0 | 0 |

Time can be presented as:

| meter | kilogram | second | ampere | kelvin | mole | candela |
| --- | --- | --- | --- | --- | --- | --- |
| 0 | 0 | 1 | 0 | 0 | 0 | 0 |

So, presentation of Length/Time^2 (Acceleration) considers the number of degree for each constituent and position either in the numerator or denominator:

| meter | kilogram | second | ampere | kelvin | mole | candela |
| --- | --- | --- | --- | --- | --- | --- |
| 1 | 0 | −2 | 0 | 0 | 0 | 0 |

Additions and subtractions deal with quantities with the same unit of measurement. There is no meaning trying to add 5 meters to 10 seconds.

Exponentials or powers deal with integer exponents. From a unit perspective, there is no meaning of 3 meters powered by 1.23. But, trying to resolve 3 meters power by 2 results in 9 square meters—area as physical dimension.

Accordingly, the following sequence shows evaluation of physical dimensions for all 80 sub expressions (V@R_1 to V@R_80), and the four initial sorted expressions (Y, Z, W, V) according to the rationalized order. These are listed below according to:

sub expression name: dimension: sub expression.

V@R_45: No meaningful unit of measurement: X1*X7 [kg*(m/s)]

| meter | kilogram | second | ampere | kelvin | mole | candela |
| --- | --- | --- | --- | --- | --- | --- |
| 1 | 1 | −1 | 0 | 0 | 0 | 0 |

V@R_46: Meter/second (Speed): V@R_45/X5 [(m*kg/s)/kg]

V@R_47: Meter/second squared (Acceleration): V@R_46*X4 [(m/s)/s)]

V@R_1: Meter/second squared (Acceleration): −V@R_47 [m/s^2]

V@R_2: −1

V@R_34: Cubic meter (Volume): X6^X9 [m^3]

V@R_35: No meaningful unit of measurement: X7^V@R_2 [(m/s)^(−1)]

| meter | kilogram | second | ampere | kelvin | mole | candela |
| --- | --- | --- | --- | --- | --- | --- |
| −1 | 0 | 1 | 0 | 0 | 0 | 0 |

V@R_48: 1/cubic meter (Particle concentration): 1/V@R_34 [1/(m^3)]

V@R_3: No meaningful unit of measurement: V@R_48/V@R_35 [(1/(m^3))/(m/s)^(−1)]

| meter | kilogram | second | ampere | kelvin | mole | candela |
|---|---|---|---|---|---|---|
| −2 | 0 | −1 | 0 | 0 | 0 | 0 |

V@R_36: No meaningful unit of measurement: X4^3 [(1/s)^3]

| meter | kilogram | second | ampere | kelvin | mole | candela |
|---|---|---|---|---|---|---|
| 0 | 0 | −3 | 0 | 0 | 0 | 0 |

V@R_37: No meaningful unit of measurement: 1/V@R_36 [1/(1/s)^3]

| meter | kilogram | second | ampere | kelvin | mole | candela |
|---|---|---|---|---|---|---|
| 0 | 0 | 3 | 0 | 0 | 0 | 0 |

V@R_4: No meaningful unit of measurement: X3*V@R_37 [m*(1/(1/s)^3)]

| meter | kilogram | second | ampere | kelvin | mole | candela |
|---|---|---|---|---|---|---|
| 1 | 0 | 3 | 0 | 0 | 0 | 0 |

V@R_5: No meaningful unit of measurement: V@R_4 ^ V@R_2 [(m*(1/(1/s)^3))^(−1)]

| meter | kilogram | second | ampere | kelvin | mole | candela |
|---|---|---|---|---|---|---|
| −1 | 0 | −3 | 0 | 0 | 0 | 0 |

V@R_49: Hertz (Frequency): X4/X2 [(1/s)/number]
V@R_50: Meter/second (Speed): V@R_49*X3 [(1/s)*m]
V@R_6: Meter/second (Speed): V@R_50/16.61[((1/s)*m)/number]
V@R_7: Hertz (Frequency): X2*X4 [number*(1/s)]
V@R_8: Meter/second (Speed): X7*12.34 [(m/s)*number]
V@R_9: Kilogram/second (Mass flow): X1*X4 [kg*(1/s)]
V@R_51: Second (Time): −1/V@R_7 [number/(1/s)]
V@R_52: Second (Time): X3/V@R_8 [m/(m/s)]
V@R_53: Second (Time): X5/V@R_9 [kg/(kg*(1/s))]
V@R_81: Second (Time): V@R_51−V@R_52 [s−s]
V@R_10: Second (Time): V@R_81−V@R_53 [s−s]
V@R_11: Meter/second squared (Acceleration): V@R_6/V@R_10 [(m/s)/s]
V@R_54: Dimensionless product: X8*X4 [s*(1/s)]

| meter | kilogram | second | ampere | kelvin | mole | candela |
|---|---|---|---|---|---|---|
| 0 | 0 | 0 | 0 | 0 | 0 | 0 |

V@R_55: Dimensionless product: X4*X8 [(1/s)*s]

| meter | kilogram | second | ampere | kelvin | mole | candela |
|---|---|---|---|---|---|---|
| 0 | 0 | 0 | 0 | 0 | 0 | 0 |

V@R_82: Dimensionless product: −V@R_54−X2 [number−number]

| meter | kilogram | second | ampere | kelvin | mole | candela |
|---|---|---|---|---|---|---|
| 0 | 0 | 0 | 0 | 0 | 0 | 0 |

V@R_83: Dimensionless product: V@R_82−X2 [number−number]

| meter | kilogram | second | ampere | kelvin | mole | candela |
|---|---|---|---|---|---|---|
| 0 | 0 | 0 | 0 | 0 | 0 | 0 |

V@R_84: Dimensionless product: V@R_83+V@R_55 [number+number]

| meter | kilogram | second | ampere | kelvin | mole | candela |
|---|---|---|---|---|---|---|
| 0 | 0 | 0 | 0 | 0 | 0 | 0 |

V@R_85: Dimensionless product: V@R_84+X2 [number+number]

| meter | kilogram | second | ampere | kelvin | mole | candela |
|---|---|---|---|---|---|---|
| 0 | 0 | 0 | 0 | 0 | 0 | 0 |

V@R_12: Dimensionless product: V@R_85+X9 [number+number]

| meter | kilogram | second | ampere | kelvin | mole | candela |
|---|---|---|---|---|---|---|
| 0 | 0 | 0 | 0 | 0 | 0 | 0 |

V@R_56: Dimensionless product: 11.25/22.6 [number/number]

| meter | kilogram | second | ampere | kelvin | mole | candela |
|---|---|---|---|---|---|---|
| 0 | 0 | 0 | 0 | 0 | 0 | 0 |

V@R_13: Dimensionless product: V@R_56−33.22 [number−number]

| meter | kilogram | second | ampere | kelvin | mole | candela |
|---|---|---|---|---|---|---|
| 0 | 0 | 0 | 0 | 0 | 0 | 0 |

V@R_14: Dimensionless product: ABS(V@R_13) [number]

| meter | kilogram | second | ampere | kelvin | mole | candela |
|---|---|---|---|---|---|---|
| 0 | 0 | 0 | 0 | 0 | 0 | 0 |

V@R_38: Cubic meter (Volume): X3^3 [m^3]
V@R_57: No meaningful unit of measurement: V@R_9*V@R_38 [(kg/s)*m^3]

| meter | kilogram | second | ampere | kelvin | mole | candela |
|---|---|---|---|---|---|---|
| 3 | 1 | −1 | 0 | 0 | 0 | 0 |

V@R_58: No meaningful unit of measurement: V@R_57/X8 [((kg/s)*m^3)/s]

| meter | kilogram | second | ampere | kelvin | mole | candela |
|---|---|---|---|---|---|---|
| 3 | 1 | −2 | 0 | 0 | 0 | 0 |

V@R_59: Newton/meter (Surface tension): V@R_58*X11 [(((kg/s)*m^3)/s)*(1/m^3)]
V@R_60: Hertz (Frequency): V@R_59/X12 [(kg/s^2)/(kg/s)]
V@R_61: Dimensionless product: V@R_60*X13 [(1/s)*s]

| meter | kilogram | second | ampere | kelvin | mole | candela |
|---|---|---|---|---|---|---|
| 0 | 0 | 0 | 0 | 0 | 0 | 0 |

V@R_15: Dimensionless product: V@R_61*X9 [number*number]

| meter | kilogram | second | ampere | kelvin | mole | candela |
|---|---|---|---|---|---|---|
| 0 | 0 | 0 | 0 | 0 | 0 | 0 |

V@R_86: Dimensionless product: V@R_12+V@R_14 [number+number]

| meter | kilogram | second | ampere | kelvin | mole | candela |
|---|---|---|---|---|---|---|
| 0 | 0 | 0 | 0 | 0 | 0 | 0 |

V@R_16: Dimensionless product: V@R_86−V@R_15 [number−number]

| meter | kilogram | second | ampere | kelvin | mole | candela |
|---|---|---|---|---|---|---|
| 0 | 0 | 0 | 0 | 0 | 0 | 0 |

V@R_62: Dimensionless product: V@R_16/X2 [number/number]

| meter | kilogram | second | ampere | kelvin | mole | candela |
|---|---|---|---|---|---|---|
| 0 | 0 | 0 | 0 | 0 | 0 | 0 |

V@R_17: Dimensionless product: 10.1+V@R_62 [number+number]

| meter | kilogram | second | ampere | kelvin | mole | candela |
|---|---|---|---|---|---|---|
| 0 | 0 | 0 | 0 | 0 | 0 | 0 |

V@R_39: No meaningful unit of measurement: V@R_3^V@R_2 [(1/(m^3))/(m/s)^(−1)]

| meter | kilogram | second | ampere | kelvin | mole | candela |
|---|---|---|---|---|---|---|
| 2 | 0 | 1 | 0 | 0 | 0 | 0 |

V@R_63: Meter/second squared (Acceleration): −666.456*X10 [number*(m/s^2)]
V@R_64: Meter/second squared (Acceleration): V@R_39*V@R_5 [(m^2*s)*(1/(m^3))]
V@R_65: Meter/second squared (Acceleration): V@R_11*V@R_17 [(m/s^2)*number]
V@R_87: Meter/second squared (Acceleration): V@R_63−V@R_64 [(m/s^2)−(m/s^2)]
V@R_18: Meter/second squared (Acceleration): V@R_87+V@R_65 [(m/s^2)+(m/s^2)]

As a result of the above, the output variable Y is shown to have a unit of Meter/second squared (Acceleration): V@R_1+V@R_18 [(m/s^2)+(m/s^2)].

V@R_40: Second (Time): X4^V@R_2 [(1/s)^(−1)]
V@R_66: Meter/second (Speed): X7*12.4 [(m/s)*number]
V@R_67: Second (Time): V@R_66/Y [(m/s)/(m/s^2)]
V@R_19: Second (Time): V@R_40+V@R_67 [s+s]
V@R_41: Dimensionless product: 3.5^X9 [number^number]

| meter | kilogram | second | ampere | kelvin | mole | candela |
|---|---|---|---|---|---|---|
| 0 | 0 | 0 | 0 | 0 | 0 | 0 |

V@R_68: Kilogram (Mass): X1/V@R_41 [kg/number]
V@R_20: No meaningful unit of measurement: V@R_68*V@R_19 [kg*s]

| meter | kilogram | second | ampere | kelvin | mole | candela |
|---|---|---|---|---|---|---|
| 0 | 1 | 1 | 0 | 0 | 0 | 0 |

V@R_21: −2
V@R_42: Kilogram/Joule (Mass per Energy): X7^V@R_21 [(m/s)^(−2)] (Mass/Energy=kg/(kg*m^2/s^2)=s^2/m^2)
V@R_69: Meter/second squared (Acceleration): Y*12.34 [(m/s^2)*number]
V@R_22: No meaningful unit of measurement: V@R_69*V@R_42

| meter | kilogram | second | ampere | kelvin | mole | candela |
|---|---|---|---|---|---|---|
| −1 | 0 | 0 | 0 | 0 | 0 | 0 |

V@R_23: 23.02+456.98 [number+number]
V@R_70: 6.87225/3.234 [number/number]
V@R_24: Dimensionless product: V@R_70+477.875 [number+number]

| meter | kilogram | second | ampere | kelvin | mole | candela |
|---|---|---|---|---|---|---|
| 0 | 0 | 0 | 0 | 0 | 0 | 0 |

V@R_25: Dimensionless product: V@R_23/V@R_24 [number/number]

| meter | kilogram | second | ampere | kelvin | mole | candela |
|---|---|---|---|---|---|---|
| 0 | 0 | 0 | 0 | 0 | 0 | 0 |

V@R_43: Kilogram (Mass): X5^V@R_25 [kg^1] (V@R_25=1 since it is a product of pure numbers only: 1=(23.02+456.98)/(6.87225/3.234+477.875))
V@R_26: Dimensionless product: V@R_43/X5 [kg/kg]

| meter | kilogram | second | ampere | kelvin | mole | candela |
|---|---|---|---|---|---|---|
| 0 | 0 | 0 | 0 | 0 | 0 | 0 |

V@R_71: Hertz (Frequency): V@R_26/X8 [number/s]
V@R_27: Hertz (Frequency): X4−V@R_71 [(1/s)−(1/s)]
V@R_72: Meter (Length): V@R_2*X6 [number*m]
V@R_73: Dimensionless product: V@R_72*V@R_22 [m*(1/m)]

| meter | kilogram | second | ampere | kelvin | mole | candela |
|---|---|---|---|---|---|---|
| 0 | 0 | 0 | 0 | 0 | 0 | 0 |

V@R_74: Dimensionless product: X8*V@R_27 [s*(1/s)]

| meter | kilogram | second | ampere | kelvin | mole | candela |
|---|---|---|---|---|---|---|
| 0 | 0 | 0 | 0 | 0 | 0 | 0 |

V@R_28: Dimensionless product: V@R_73+V@R_74 [number+number]

| meter | kilogram | second | ampere | kelvin | mole | candela |
|---|---|---|---|---|---|---|
| 0 | 0 | 0 | 0 | 0 | 0 | 0 |

V@R_29: Dimensionless product: LOG(V@R_28) [number]

| meter | kilogram | second | ampere | kelvin | mole | candela |
|---|---|---|---|---|---|---|
| 0 | 0 | 0 | 0 | 0 | 0 | 0 |

V@R_75: Second (Time): X7/Y [(m/s)/(m/s^2)]
V@R_30: Dimensionless product: V@R_75*X4 [s*(1/s)]

| meter | kilogram | second | ampere | kelvin | mole | candela |
|---|---|---|---|---|---|---|
| 0 | 0 | 0 | 0 | 0 | 0 | 0 |

V@R_31: Dimensionless product: 222.22−V@R_30 [number−number]

| meter | kilogram | second | ampere | kelvin | mole | candela |
|---|---|---|---|---|---|---|
| 0 | 0 | 0 | 0 | 0 | 0 | 0 |

V@R_32: Dimensionless product: COS(V@R_31) [number]

| meter | kilogram | second | ampere | kelvin | mole | candela |
|---|---|---|---|---|---|---|
| 0 | 0 | 0 | 0 | 0 | 0 | 0 |

V@R_33: Dimensionless product: V@R_29−V@R_32 [number−number]

| meter | kilogram | second | ampere | kelvin | mole | candela |
|---|---|---|---|---|---|---|
| 0 | 0 | 0 | 0 | 0 | 0 | 0 |

V@R_76: Second (Time): V@R_20/X5 [(kg*s)/kg]
V@R_77: Second (Time): V@R_33*X13 [number*s]
V@R_78: Second (Time): V@R_77/123.321 [s/number]

As a result of the above, the initial expression Z is shown to have a unit of Second (Time): V@R_76+V@R_78 [s+s].

V@R_44: No meaningful unit of measurement: X7^3 [(m/s)^3]

| meter | kilogram | second | ampere | kelvin | mole | candela |
|---|---|---|---|---|---|---|
| 3 | 0 | −3 | 0 | 0 | 0 | 0 |

V@R_79: No meaningful unit of measurement: Z/Y [s/(m/s^2)]

| meter | kilogram | second | ampere | kelvin | mole | candela |
|---|---|---|---|---|---|---|
| −1 | 0 | 3 | 0 | 0 | 0 | 0 |

As a result of the above, the initial expression W is shown to have a unit of Square meter (Area): V@R_79*V@R_44 [(s^3/m)*(m^3/s^3)].

V@R_80: Cubic meter (Volume): W*X3 [(m^2)*m].

As a result of the above, the initial expression V is shown to have a unit of Cubic meter (Volume): V@R_80+V@R_38 [m^3±m^3].

Thus, upon successful fragmentation to simple sub expressions and evaluation of units of measurement for each constituent from the calculation chain, the physical dimensions of the initial four expressions Y, Z, W, and V, have been evaluated. Here, the initial expression Y has the dimension Acceleration, the initial expression Z has the dimension Time, the initial expression W has the dimension Area, and the initial expression V has the dimension Volume. The objective is accomplished.

Embodiments are not limited to the above disclosure or specific example, and alternatives are possible. Thus while the calculation chain has been described as a series of equations setting forth dependencies in the form of mathematical expressions, it can include other dependency types. One example of such a dependency is a decision, e.g., as may be expressed in the form of a decision tree.

Solving decisions may comprise a custom (formula interpreter dependent) task, subjective to the particular concrete approach of presenting 'decision' patterns, writing them, and the way they should be interpreted. The following offers one example of a decision:
DECISION([SQRT(FUEL)^−2,0E+00>=ABS(Y)*CONST^(−2/3)&LOG(FUEL)<100/2]\
[FUEL=HHV\10*CONST=SIN(2,0E−03)]:COS(60)#
[FUEL>=10&FUEL<100]1[FUEL=HHV\HHV>=0,34]:
LOG10(1000))

Special symbols used in the example above are:
'&' logical AND;
'|' logical OR;
':' stands for logical IF (If the expression prior ':' is TRUE then do what is stated after ':');

'#' stands for logical ELSE (If the preceding logical expression is NOT TRUE then do the logical statement stated after '#'). It serves also as logical repeater thus allowing chaining of multiple logical conditions:
DECISION(logical conditions1:action1# logical conditions2:action2# logical conditions3:action3# . . . # logical conditionsN:actionN).
Thus from left to right, if logical conditions1 is true then DO action1 and exit; if it is false then evaluate logical conditions2. If logical conditions2 is true DO action2 and exit; if it is false then evaluate next logical conditions, and so on until the end of DECISION.

It is noted that the ability of embodiments to incorporate metadata, may provide an ability to work with series (vectors) and series of series. Thus in certain applications each variable presents (holds) more than one number.

This aspect could be useful, for example, where variables represent compositions. Thus returning to the industrial plant gas emissions example, an expression could include a variable representing atmospheric air—a complex composition of different constituents (e.g., elements, compounds, pollutants, particles, etc.).

So, given an equation MY_GAS=10*AIR−CONST^2, with AIR a variable of type series representing the above composition, the result of the MY_GAS equation should also be series holding the same number of calculated numbers as the input variable AIR. Each constituent of the result composition will be evaluated separately by the given expression.

As mentioned previously, by handling calculations representing dependencies between complex entities having multiple attributes (e.g., metadata), particular embodiments may be particularly suited to interacting with a database. Moreover, embodiments may implement calculations in terms of table functions commonly employed for database data.

Thus particular embodiments may exhibit an ability to work with aggregation functions: AVG, SUM, MAX, MIN, COUNT. As the input variables may be series of pure numbers or vectors, in dealing with compositions aggregations may be valuable, with variables represented as series of series.

For example, the variable MY_MONTHLY_AIR could be a series holding twelve (12) subseries of compositions with different values for the included constituents. Given the equation:

AVG_YEARLY_AIR=AVG(MY_MONTHLY_AIR)

The result AVG_YEARLY_AIR may be automatically evaluated as a pure series representing the composition which is the average aggregated product of the input series of series. Thus, MY_MONTHLY_AIR might look like the following:
MY_MONTHLY_AIR=
{[(valueJAN,identifier1),(valueJAN,identifier2),(valueJAN,identifier3)]
[(valueFEB,identifier1),(valueFEB,identifier2),(valueFEB,identifier3)]
[(valueMAR,identifier1),(valueMAR,identifier2),(valueMAR,identifier3)]
. . .
[(valueDEC,identifier1),(valueDEC,identifier2),(valueDEC,identifier3)]}
This is a series of 12 vectors (for all months through the year). Each vector represents a composition of 3 values with unique identifiers. Thus the result AVG_YEARLY_AIR will be presented as a pure vector with 3 aggregated values:

AVG_YEARLY_AIR=[(aggregated_result_value1,identifier1),
(aggregated_result_value2,identifier2),
(aggregated_result_value3,identifier3)]

Embodiments may allow visualizing many possible math functions and other specific functions like aggregation routines or decision patterns upon which the Calculation Engine operates. This includes but is not limited to FUNCTION, MEANIING, DEFINITION RANGE, and DOCUMENTATION.

A calculation engine according to embodiments can exhibit one or more of the following characteristics. The engine can fetch input data from a database, make some calculations on them, and write the results back to a database, with acceptable performance.

The engine may be configurable by the user. Configuration can be done by setting variables, and/or by combining (i.e. chaining) deterministic functions (i.e. same outputs for same inputs) with well-defined input and output variables. Such configurability need not be out of the reach of an average user. Thus embodiments may reduce implementation time and complexity compared to classical database programming for the same tasks.

The calculation engine may reference a documented library of table, matrix, and/or vector functions covering primary calculation patterns commonly encountered. Examples can include but are not limited to greenhouse gas Emission calculations, financial planning, and price and commission calculations.

Embodiments may be agnostic with respect to underlying databases and/or data structures. Thus aside from reader/writer functions reading/writing data from/into a database interface, a calculation engine may not connect with a database during the calculations.

Thus, the database holding actual values for each input variable may be decoupled from the engine. The engine itself may be generic, while the surrounding consuming framework may be custom and vary between different use cases.

The database holding metadata of calculation objects already created or to be created, is actually the 'Content' database. Different approaches of using the engine determine use cases whether the engine should be:
  coupled with the 'Content' database (if there are cases for invocation of other already created Calculation Objects); or
  decoupled from the 'Content' database (if the 'Input' interface feeding the engine will carry all preliminary needed information for a complete calculation).

All calculations may be done with arrays in RAM that represent tables, matrices, or vectors. Thus aggregation functions may be supported via internal tables holding the necessary data loaded with the help of the input interface.

If the calculation of an aggregation function based on the internal tables causes performance issues, embodiments of the engine support use of preliminary SQL calculated aggregation data. Embodiments may distinguish whether the aggregation is already performed (during the data provisioning phase) and has to be only consumed as-is by the engine, or whether the engine has to aggregate the input data provided in the internal tables.

The database-agnostic character of certain embodiments, can make it possible to integrate the calculation engine with a variety of databases and/or data structures. Such approaches may rely upon stored procedures in a database, whose parameters and functionality depend on the data structure of its database like table definitions and fields.

In summary, embodiments of calculation frameworks may exhibit an ability to configure dependency trees with input and output variables, that are combined through (table) functions determining the dependencies. Dependent output variables can be updated automatically if an input variable is changed.

A library of (table) functions may be provided, as well as a structure allowing users to formulate their own formulas (user-defined functions).

Embodiments may allow configuration of multiple input and output (table) variables, related with nodes of a calculation network (function tree).

Embodiments may allow management and/or storage of multiple calculation instances of a function tree. Returning again to the gas emissions example, a function tree computing expected month-end $CO_2$ emission, is be executed at the beginning of every month. Accordingly, such a function tree has a calculation instance for every month.

Figure 6:
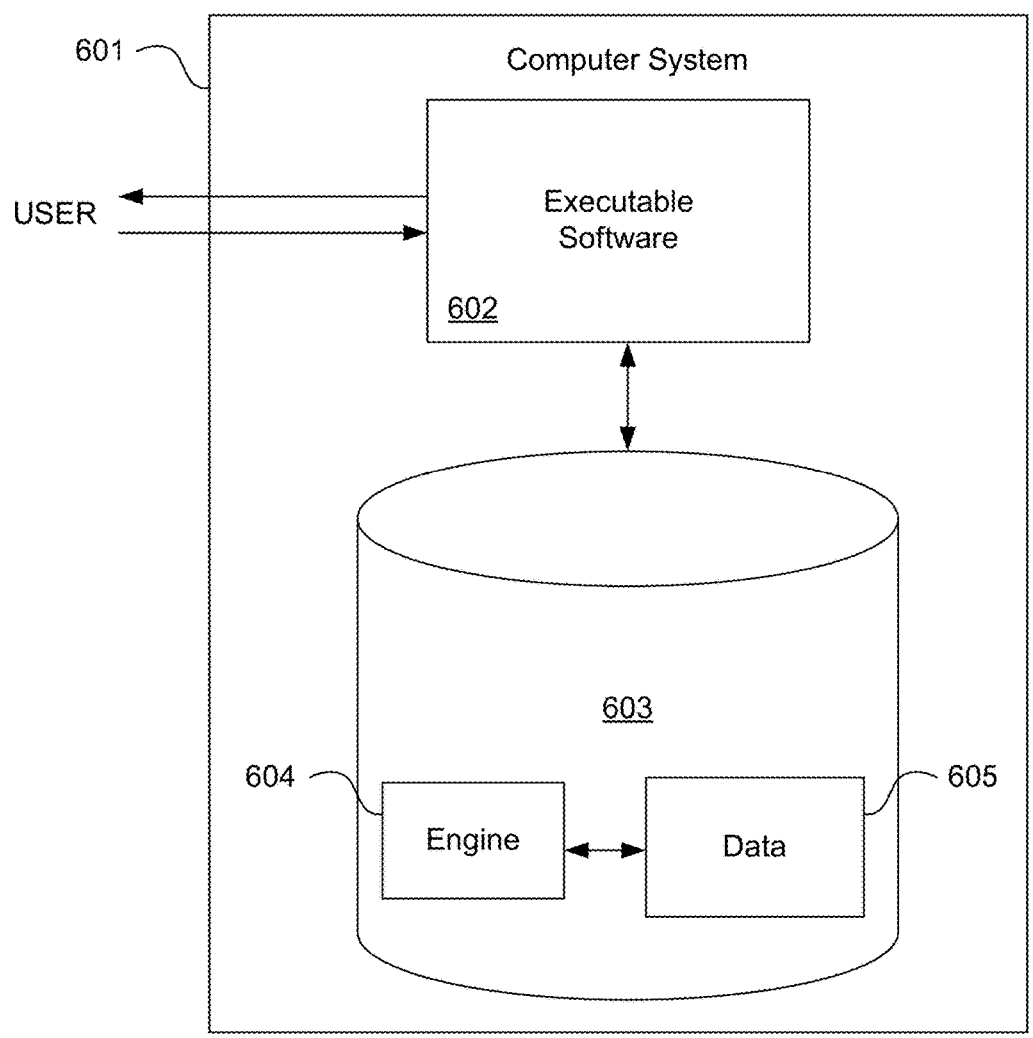
FIG. 6 illustrates hardware of a special purpose computing machine configured to provide a calculation framework according to an embodiment.

FIG. 6 illustrates hardware of a special purpose computing machine configured to provide a calculation framework according to an embodiment. In particular, computer system 601 comprises a processor 602 that is in electronic communication with a non-transitory computer-readable storage medium 603. This computer-readable storage medium has stored thereon code 605 corresponding to initial inputs. Code 604 corresponds to a calculation engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 6, the engine is shown as being part of the database. Such an embodiment can correspond to applications where processing is performed by a powerful engine available as part of an in-memory database (e.g., the HANA in-memory database available from SAP SE of Walldorf, Germany. However this is not required and in certain embodiments the engine may be implemented in other ways, for example as part of an application layer overlying a database layer.

Figure 7:
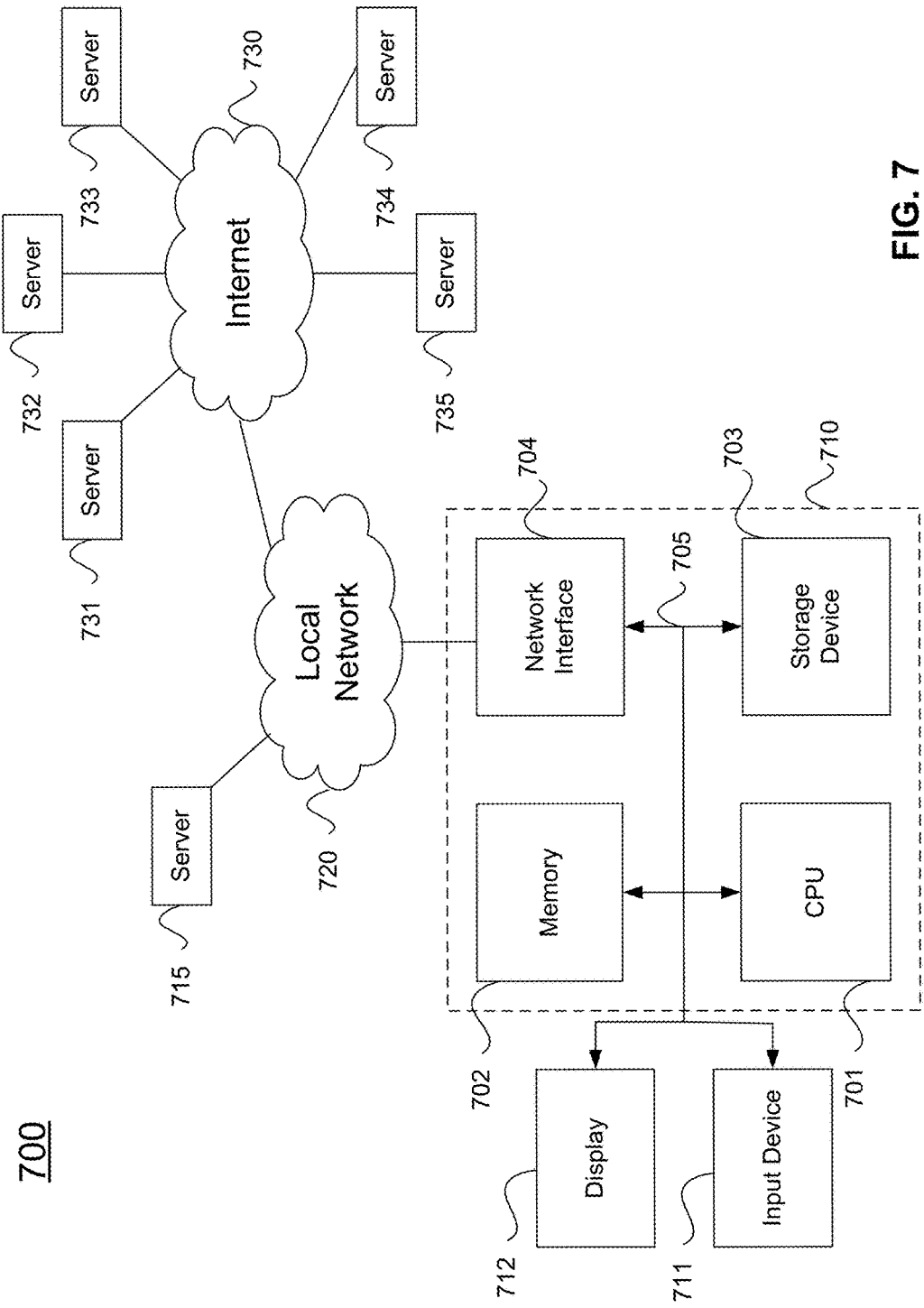
FIG. 7 illustrates an example of a computer system.

One example of a computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments, along with examples of how aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an engine receiving a first entity related to a second entity by a dependency;
the engine fragmenting the first entity into a plurality of sub expressions;
the engine storing the plurality of sub expressions in a data object of a database;
the engine deriving first metadata of the plurality of sub expressions from second metadata of the second entity;
the engine storing the first metadata in the data object;
the engine creating third metadata of the first entity based upon the first metadata of the plurality of sub expressions; and
the engine displaying the third metadata to a user, wherein,
the first entity comprises an equation, the second entity comprises a variable in the equation, and wherein:

the third metadata comprises a first physical unit of an output variable of the equation.

2. A method as in claim 1 wherein:
the dependency comprises a mathematical relation.

3. A method as in claim 1 wherein the first physical unit is a dimensional array.

4. A method as in claim 1 wherein the engine creates the fragments according to a priority considering:
grouping of expressions;
exponents/powers in expressions; and
multiplication/division in expressions.

5. A method as in claim 1 wherein a fragment comprises a unary expression, a binary expression, or an expression involving three or more operations at a same priority level.

6. A method as in claim 1 wherein the engine processes the fragments according to a table function.

7. A method as in claim 1 wherein the dependency comprises a decision.

8. A method as in claim 1 wherein the third metadata comprises vector information.

9. A non-transitory computer readable storage medium embodying a computer program for performing a method, said method comprising:
an engine receiving a first entity related to a second entity by a dependency;
the engine fragmenting the first entity into a plurality of sub expressions;
the engine storing the plurality of sub expressions in a data object of a database;
the engine deriving first metadata of the plurality of sub expressions from second metadata of the second entity;
the engine storing the first metadata in the data object;
the engine creating third metadata of the first entity based upon the first metadata of the plurality of sub expressions; and
the engine displaying the third metadata to a user, wherein,
the first entity comprises an equation,
the second entity comprises a variable in the equation, and wherein:
the third metadata comprises a physical unit of an output variable of the equation.

10. A non-transitory computer readable storage medium as in claim 9 wherein the physical unit is a dimensional array.

11. A non-transitory computer readable storage medium as in claim 10 wherein the engine processes the fragments according to a table function.

12. A non-transitory computer readable storage medium as in claim 9 wherein the third metadata comprises vector information.

13. A non-transitory computer readable storage medium as in claim 9 wherein:
the engine creates the fragments according to a priority considering,
a grouping of the expression,
exponents/powers in the expression, and
multiplication/division in the expressions; and
a fragment comprises a unary expression, a binary expression, or an expression involving three or more operations at a same priority level.

14. A non-transitory computer readable storage medium as in claim 9 wherein the dependency comprises a decision.

15. A computer system comprising:
one or more processors;
a software program, executable on said computer system, the software program configured to cause a calculation engine to:
receive a first entity related to a second entity by a dependency;
fragment the first entity into a plurality of sub expressions;
store the plurality of sub expressions in a data object of a database;
derive first metadata of the plurality of sub expressions from second metadata of the second entity;
store the first metadata in the data object;
create third metadata of the first entity based upon the first metadata of the plurality of sub expressions; and
display the third metadata to a user, wherein:
the first entity comprises an equation;
the second entity comprises a variable in the equation; and
the third metadata comprises a physical unit of an output variable of the equation.

16. A computer system as in claim 15 wherein the physical unit is a dimensional array.

17. A computer system as in claim 15 wherein the engine creates the third metadata of the first entity utilizing a table function.

18. A computer system as in claim 15 wherein:
the third metadata comprises vector information.

19. A computer system as in claim 15 wherein the dependency comprises a mathematical relation.

20. A computer system as in claim 15 wherein the dependency comprises a decision.

* * * * *